United States Patent
Piasecki et al.

(10) Patent No.: US 9,944,389 B2
(45) Date of Patent: Apr. 17, 2018

(54) MODULAR AND MORPHABLE AIR VEHICLE

(71) Applicant: Piasecki Aircraft Corporation, Essington, PA (US)

(72) Inventors: John W. Piasecki, Bryn Mawr, PA (US); Frederick W. Piasecki, Haverford, PA (US); Brian Geiger, Glen Mills, PA (US); Douglas Johnson, Essington, PA (US); David Pitcairn, Essington, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 15/476,612

(22) Filed: Mar. 31, 2017

(65) Prior Publication Data
US 2017/0210469 A1    Jul. 27, 2017

Related U.S. Application Data

(63) Continuation of application No. 15/205,162, filed on Jul. 8, 2016, now Pat. No. 9,610,817, which is a
(Continued)

(51) Int. Cl.
| | |
|---|---|
| *B64C 37/00* | (2006.01) |
| *B64C 29/00* | (2006.01) |
| *B60F 5/02* | (2006.01) |
| *B64C 11/00* | (2006.01) |
| *B64C 27/08* | (2006.01) |
| *B64C 27/20* | (2006.01) |

(Continued)

(52) U.S. Cl.
CPC ............ *B64C 37/00* (2013.01); *B60F 5/02* (2013.01); *B64C 3/56* (2013.01); *B64C 11/001* (2013.01); *B64C 27/08* (2013.01); *B64C 27/20* (2013.01); *B64C 27/22* (2013.01); *B64C 27/57* (2013.01); *B64C 29/0033* (2013.01); *B64C 39/02* (2013.01); *B64D 17/80* (2013.01); *G05D 1/102* (2013.01)

(58) Field of Classification Search
CPC ..... B64C 29/0033; B64C 29/00; B64C 27/22; B64C 27/08; B64C 27/20; B64C 3/56; B64C 11/001; B64C 37/00; B64C 39/00; B60F 5/02
See application file for complete search history.

(56) References Cited

U.S. PATENT DOCUMENTS

| | | | | |
|---|---|---|---|---|
| 3,605,935 A | * | 9/1971 | Gilbert | B60F 5/02 104/118 |
| 3,721,403 A | * | 3/1973 | Gray | B64C 27/02 244/7 A |

(Continued)

*Primary Examiner* — Benjamin P Lee
(74) *Attorney, Agent, or Firm* — Robert J. Yarbrough; Lipton, Weinberger & Husick

(57) ABSTRACT

An air module may be attached to a ground module. The air module may be equipped with a center of gravity effector to change the relative locations and hence the center of gravity of the air and ground modules when the modules are attached. The center of gravity effector may be active or passive or a combination of active and passive. The center of gravity effector may be combined with a center of lift effector to change the relative locations of the center of gravity and center of lift.

18 Claims, 36 Drawing Sheets

Related U.S. Application Data continuation of application No. 14/684,995, filed on Apr. 13, 2015, now Pat. No. 9,393,847, which is a continuation of application No. 13/068,601, filed on May 16, 2011, now Pat. No. 9,045,226.

(60) Provisional application No. 61/416,965, filed on Nov. 24, 2010, provisional application No. 61/345,535, filed on May 17, 2010.

(51) Int. Cl.
| | | |
|---|---|---|
| *B64C 27/22* | (2006.01) | |
| *B64C 27/57* | (2006.01) | |
| *B64D 17/80* | (2006.01) | |
| *B64C 39/02* | (2006.01) | |
| *B64C 3/56* | (2006.01) | |
| *G05D 1/10* | (2006.01) | |

(56) References Cited

U.S. PATENT DOCUMENTS

| | | | | |
|---|---|---|---|---|
| 3,971,535 | A * | 7/1976 | Jones | B64C 3/40 244/46 |
| 4,117,900 | A * | 10/1978 | Amick | B62D 35/00 180/7.1 |
| 4,132,374 | A * | 1/1979 | Abell | B64C 3/40 244/46 |
| 4,691,878 | A * | 9/1987 | Vaughan | B64C 3/56 244/49 |
| 4,998,689 | A * | 3/1991 | Woodcock | B64C 3/38 244/201 |
| 5,337,974 | A * | 8/1994 | Rumberger | B64C 3/56 244/39 |
| 5,454,530 | A * | 10/1995 | Rutherford | B64C 27/24 244/22 |
| 5,842,667 | A * | 12/1998 | Jones | B64C 29/0025 244/114 R |
| 5,984,228 | A * | 11/1999 | Pham | B64C 37/00 244/100 R |
| 6,129,306 | A * | 10/2000 | Pham | B64C 37/00 244/2 |
| 6,224,012 | B1 * | 5/2001 | Wooley | B60F 5/02 244/121 |
| 6,655,631 | B2 * | 12/2003 | Austen-Brown | B64C 27/28 244/12.4 |
| 6,669,137 | B1 * | 12/2003 | Chen | B64C 3/40 244/7 R |
| 6,824,095 | B2 * | 11/2004 | Mao | B64C 37/00 244/12.5 |
| 7,806,362 | B2 * | 10/2010 | Yoeli | B60V 1/043 244/12.4 |
| 7,874,512 | B2 * | 1/2011 | Xu | B60F 5/02 244/2 |
| 7,938,358 | B2 * | 5/2011 | Dietrich | B60F 5/02 244/2 |
| 8,070,090 | B2 * | 12/2011 | Tayman | B64C 27/24 244/6 |
| 8,162,253 | B2 * | 4/2012 | Seiford, Sr. | B60F 5/02 244/7 R |
| 8,267,347 | B2 * | 9/2012 | Goldshteyn | B64C 37/00 244/2 |
| 8,292,216 | B1 * | 10/2012 | Rumberger, Jr. | B64C 3/56 244/39 |
| 8,371,520 | B2 * | 2/2013 | Easter | B60F 5/02 244/199.4 |
| 8,376,263 | B2 * | 2/2013 | Eames | B60F 5/02 244/12.3 |
| 8,511,603 | B2 * | 8/2013 | Blomeley | B64C 3/56 244/2 |
| 8,528,852 | B2 * | 9/2013 | Farrag | B60F 5/02 244/120 |
| 8,646,720 | B2 * | 2/2014 | Shaw | B64C 27/20 244/17.23 |
| 9,027,879 | B1 * | 5/2015 | Talmage, Jr. | B64C 27/006 244/118.2 |
| 9,254,916 | B2 * | 2/2016 | Yang | B64C 3/546 |
| 9,387,939 | B2 * | 7/2016 | Lundgren | B64D 47/08 |
| 2006/0113425 | A1 * | 6/2006 | Rader | B64C 15/00 244/17.11 |
| 2008/0272244 | A1 * | 11/2008 | Bjornenak | B64C 3/385 244/7 R |
| 2009/0008499 | A1 * | 1/2009 | Shaw | B64C 27/20 244/17.23 |
| 2010/0230532 | A1 * | 9/2010 | Dietrich | B60F 5/02 244/49 |
| 2010/0270417 | A1 * | 10/2010 | Goldshteyn | B64C 37/00 244/2 |
| 2010/0301168 | A1 * | 12/2010 | Raposo | A63H 23/00 244/171.2 |
| 2011/0036938 | A1 * | 2/2011 | Blomeley | B64C 3/56 244/2 |
| 2011/0036939 | A1 * | 2/2011 | Easter | B60F 5/02 244/2 |
| 2011/0042507 | A1 * | 2/2011 | Seiford, Sr. | B60F 5/02 244/2 |
| 2011/0163197 | A1 * | 7/2011 | Farrag | B60F 5/02 244/2 |
| 2012/0048989 | A1 * | 3/2012 | Eames | B60F 5/02 244/2 |
| 2012/0091257 | A1 * | 4/2012 | Wolff | B64C 29/0033 244/12.4 |
| 2012/0119016 | A1 * | 5/2012 | Shaw | B64C 29/0025 244/12.3 |
| 2012/0211608 | A1 * | 8/2012 | Pancotti | B64C 29/0033 244/7 C |
| 2012/0261523 | A1 * | 10/2012 | Shaw | B64C 27/28 244/7 R |
| 2013/0126666 | A1 * | 5/2013 | Brown | B60F 5/02 244/2 |
| 2013/0168489 | A1 * | 7/2013 | McIntee | B64C 3/38 244/13 |
| 2013/0193263 | A1 * | 8/2013 | Schweighart | B60F 5/02 244/2 |
| 2013/0206915 | A1 * | 8/2013 | Desaulniers | B64C 39/024 244/165 |
| 2013/0233964 | A1 * | 9/2013 | Woodworth | B64C 37/02 244/2 |
| 2013/0256465 | A1 * | 10/2013 | Smith | B64C 27/26 244/7 C |
| 2014/0014764 | A1 * | 1/2014 | Lundgren | B64C 37/00 244/2 |
| 2014/0021291 | A1 * | 1/2014 | Vetter | B64C 39/003 244/19 |
| 2016/0159471 | A1 * | 6/2016 | Chan | B64C 39/024 244/39 |
| 2016/0264234 | A1 * | 9/2016 | Vaughn | A63H 27/12 |
| 2017/0029104 | A1 * | 2/2017 | Kim | B64C 39/02 |

\* cited by examiner

MODULAR AND MORPHABLE AIR VEHICLE

I. RELATED APPLICATIONS

This continuation patent application is entitled to priority from U.S. Provisional Patent Application 61/345,535, filed May 17, 2010 by John W. Piasecki and others and from U.S. Provisional Patent Application No. 61/416,965 filed Nov. 24, 2010 by John W. Piasecki and others, which applications are incorporated by reference in this document as if set forth in full herein. This application claims priority from U.S. utility patent application Ser. No. 13/068,601 filed May 16, 2011 by John W. Piasecki and others and issued as U.S. Pat. No. 9,045,226 on Jun. 2, 2015, which application and patent are incorporated by reference in this document as if set forth in full herein. This application claims priority from U.S. utility application Ser. No. 14/684,995 filed Apr. 13, 2015 by John W. Piasecki and others, issued as U.S. Pat. No. 9,393,847 on Jul. 19, 2016. This application claims priority from U.S. utility application Ser. No. 15/205,162 filed Jul. 8, 2016 by John W. Piasecki and others, which will be issued as U.S. Pat. No. 9,610,817 on Apr. 4, 2017. All of the above applications and patents are entitled "Modular and Morphable Air Vehicle." The following documents attached to and incorporated by reference into provisional application 61/345,535 are hereby incorporated by reference as if set forth in full herein:

A. PiAC Proposal No. 459-X-1, pages 3 through 26
  B. PiAC Report No. 459-X-2, pages 1 through 35
  C. PiAC Proposal No. 159-X-50, pages 3 through 47.

II. BACKGROUND OF THE INVENTION

A. Field of the Invention

The Invention is a modular air vehicle. The air vehicle includes an unmanned air module and a ground module that may be releasably attached to the air module. The ground module may be a wheeled passenger vehicle and may be driven on the ground under its own power either with or without the air module attached. Alternatively, the ground module may be a medical module, a cargo module, a weapons module, a passenger module or a communications module. The air module can fly either with or without the ground module engaged and can support the ground module in flight in any of three different configurations. The air module and ground module combination may fly as a rotary wing aircraft and also may fly as a tilted-rotor, fixed wing aircraft. Alternatively, the air module may fly as an open rotor rotary wing aircraft with or without tilted-rotor capability or may fly as an autogyro with or without jump capability.

B. Description of the Related Art

The prior art does not teach the modular, optionally manned, morphing, autonomous air vehicle of the invention.

III. BRIEF DESCRIPTION OF THE INVENTION

The invention is an air vehicle. The air vehicle includes an unmanned air module and any of several different ground modules, which may be manned or unmanned. The air module may fly independently of the ground module. The air module and ground module may be selectably engaged to morph the air module into an air and ground module combination. The air module may support the ground module in flight. The ground module may support the air module when the air module and attached ground module are on the ground. The ground module may be a vehicle ground module and may support the attached air module on the ground, both when the vehicle ground module is stationary and when the vehicle ground module is moving on the surface of the ground.

A. Ground Module

The ground module may be a vehicle ground module that is capable of transporting adult human beings over the ground under its own power, either with or without the air module attached. Alternatively, the ground module may be a cargo/payload module, a medical transport module, a weapons system platform, a passenger module, a communications module or may be configured to contain any other load that a user may wish to transport through the air.

The ground module and air module combination may be configured to accommodate human beings and to transport those human beings through the air. For example, the medical module is configured to accommodate human patients and a human attendant. The ground vehicle module is configured to accommodate one or more soldiers and their equipment.

B. Air Module

The air module includes at least one rotary wing. The, at least one rotary wing is configured to support the air module in flight. The at least one rotary wing also is configured to support the ground module and any cargo and human passengers that are inside the ground module in flight when the ground module is attached to the air module. The air module includes the engine(s), rotors, drive system, avionics, sensors, communications relays and autopilot control system to allow the air module to fly.

The air module is autonomous and unmanned. As used in this document, the term "autonomous" means that the air module may take-off, fly and land under the control of an autopilot control system. As used in this document, the term "unmanned" means that the air module does not accommodate a human pilot on board the air module, although a human operator may program the autopilot control system prior to flight, including selection of a mission plans, waypoints and a landing zone. During flight, a human operator also may select or change the mission plan, waypoints and landing point from a remote station or from a ground module or may control the air module remotely.

1. Twin Ducted-Fan Air Module

The air module may use any configuration of rotary wings known in the aircraft art to support an aircraft in flight. In one embodiment, the air module features two ducted fans joined by a central unit. Each ducted fan comprises a circular duct surrounding a rotor. The central unit houses the engine (s), drive system for the two ducted fans, starter batteries, flight avionics, optional sensors, communications relays and autopilot control system. The air module landing gear can double as a load-carrying structure for attachment to the ground module. The two rotors in the two ducted fans are rigid in that flapping or lead and lag hinges are not provided. The use of rigid rotors provides flexibility in accommodating changes to the center of gravity of the aircraft. The air module featuring ducted fans is referred to herein as the "ducted fan air module."

The twin ducted fan air module can transition among three different configurations in flight (that is, 'in stride') while supporting the ground module. In the first, or tandem rotor configuration, the two ducted fans are oriented fore-and-aft along the longitudinal axis of the ground module with the axes of rotation of the two rotors in a generally vertical direction. In the second, or side-by-side rotor configuration, the two ducted fans are located on either side of the longitudinal axis of the ground module with the axes of rotation of the two rotors generally in a vertical direction. In both the tandem and side-by-side rotor configurations the air module flies as a rotary wing aircraft.

In the third, or tilted-rotor configuration, the ducted fans are located on either side of the ground module, as in the side-by-side rotor configuration, but with the axes of rotation of the two rotors oriented generally parallel to the longitudinal axis of the ground module. In the tilted-rotor configuration, the air module flies as a tilted-rotor, fixed-wing aircraft with the rotors serving as propellers urging the aircraft forward.

When in the tilted-rotor configuration, the two ducts for the ducted fans serve as circular wings. The forward movement of the air module moves air over the circular wings, providing lift to the air module. A wing extension may be attached to the outboard end of each of the ducts for the two ducted fans. The wing extensions may be hinged to reduce the size of the air module when the wing extensions are not providing lift. The two wing extensions provide additional wingspan and wing area and hence provide additional lift to the air module in the tilted-rotor configuration. The two wing extensions may be arcuate in shape and may conform to the shape of the circular ducts for compact storage. The central unit also may be of an airfoil shape. The circular wings, the wing extensions and the central unit provide lift to support the weight of the air module and the ground module in flight when the air module is in the tilted-rotor configuration and moving forward through the air.

Operation in the tandem rotor configuration provides the air module with a narrow profile and allows the aircraft to operate in confined urban settings and even allows cargo or passengers to be loaded or unloaded to and from upper stories of buildings. The tandem rotor configuration involves penalties in hover performance because the downwash of the ducted fans is partially obstructed by the fore and aft portions of the ground module. The side-by-side rotor configuration avoids the downwash penalty, but the larger profile presented by the vehicle restricts operation in confined areas. The tilted-rotor configuration provides for a higher air speed and longer range of flight than is possible in either the tandem or side-by-side rotor configurations.

Each of the rotors is connected to the central unit using a torsion beam that is flexible in torsion, which allows the rotors and ducts to tilt with respect to each other when twisting moments are applied to the torsion beams. The torsion beams supports the ground module when the PAV is in flight. The torsion beams also support the rotors on the ground module when the PAV is on the ground. The rotors have differential and non-differential monocyclic pitch control in the direction normal to the axis of rotor tilt of the two rotors. The rotors also have differential and non-differential collective pitch control. The combination of the torsion beam and monocyclic pitch control, along with collective pitch control, allows control of the PAV in all axes in all three configurations. The ducted fans may be equipped with exit vanes that swivel about a vane axis parallel to the axis of rotor tilt. The vanes provide redundant control to the monocyclic pitch control and may provide additional wing area and hence additional lift when the air module is in the tilted-rotor configuration.

Yaw control: When the air module is in the first (tandem) or second (side-by-side) rotor configuration, applying differential monocyclic pitch applies a twisting moment to the flexible torsion beam, tilting the rotors differentially and allowing the rotors to apply a yawing moment to the aircraft, hence controlling yaw. In the tandem and side-by-side rotor configurations, differential vane angle control also controls yaw. When the aircraft is in the third (tilted-rotor) configuration, applying differential collective pitch to the two rotors controls yaw.

Pitch control: When the aircraft is in the first (tandem) rotor configuration, applying differential collective pitch to the rotors controls aircraft pitch. When in the side-by-side rotor configuration or the tilted-rotor configuration, applying non-differential monocyclic pitch to the rotors applies a pitching moment to the aircraft, controlling aircraft pitch. In the tilted-rotor configuration, vane angle control also controls aircraft pitch. Exhaust gas from the engine(s) may be vectored to provide additional pitching moments in the tilted-rotor or tilt duct configuration.

Roll control: When the aircraft is in the first (tandem) rotor configuration, applying non-differential monocyclic pitch to the rotors applies a rolling moment to the aircraft, controlling roll. When the aircraft is in the second (side-by-side) rotor configuration, applying differential collective pitch to the rotors controls roll. When the aircraft is in the third (tilted-rotor) configuration, applying differential monocyclic pitch to the rotors applies a rolling moment to the aircraft, controlling roll. Differential vane control also will control roll in the tilted-rotor configuration.

During transition from the side-by-side rotor configuration to tilted-rotor configuration, non-differential monocyclic pitch assists the rotors in tilting to the tilted-rotor configuration, allowing use of smaller and lighter effectors to accomplish the transition.

2. Open Rotor Air Module

The air module may dispense with circular ducts surrounding the one or more rotors. Such an air module is hereinafter referred to as an "open rotor air module." The open rotor air module also features a central unit that houses the engine(s), drive system, starter batteries, flight avionics, optional sensors, communications relays and autopilot control system. The central unit also can provide landing gear to support the open rotor air module when the open rotor air module is not flying and is not in engagement with the ground module. The central unit provides an attachment location between the open rotor air module and ground module, allowing the air module to morph to a combination of an air module and a ground module. If the air module utilizes a single rotor, either an open rotor or a ducted fan, a reaction thruster is provided to counteract the moment of the turning rotor, as in a conventional single rotor helicopter. The reaction thruster can be a propeller, ducted fan, turbojet or any of the reaction thrusters known in the rotary wing aircraft art. If two rotors are utilized, either ducted fans or open rotors, the rotors will be counter-rotating, avoiding the need for the reaction thruster. The two counter-rotating open rotors may be coaxial, may be intermeshing, may be located in tandem and may be located side-by-side.

The open rotor air module may feature two open rotors connected to and powered by the central unit. The twin open rotor air module may be capable of transitioning among the tandem rotor configuration, the side-by-side rotor configuration and the tilted-rotor configuration, as described above for the twin ducted-fan air module. The twin open rotor air module does not feature ducts and hence does not feature circular wings; however, the open rotor air module may feature a tilt wing and may feature deployable wing extensions. In all other respects, the descriptions and figures of this application applicable to the twin ducted fan air module apply equally to a twin open rotor air module.

The air module also may be configured with three or more rotors all connected to and powered by the central unit. The three or more rotors may be open rotors or ducted fans.

Unless the context otherwise requires, as used in this application the term "air module" refers to both a ducted fan fair module and an open rotor air module.

3. Autogyro Air Module

The air module may be an autogyro, which may be a 'jump' autogyro. In the jump autogyro air module, an open rotor is connected to an engine located in the central unit. The engine will turn the rotor to prepare the air module for takeoff. Turning the rotor temporarily stores kinetic energy in the rotor. To take off, the spinning rotor is disengaged from the engine and the collective pitch of the autogyro rotor blades is increased. The kinetic energy of the spinning rotor blades is converted to lift and the jump autogyro air module rises vertically from the ground.

Either before takeoff or during the ascent, the engine is connected to a propeller or other vectored thruster that urges the jump autogyro air module forward. As the airborne jump autogyro air module accelerates forward, air passes through the rotor disc from the lower side of the disc to the upper side. Once the jump autogyro air module reaches an adequate forward speed, the air moving through the rotor disc due to the forward motion of the air module maintains the rotational speed of the rotor and the air module remains airborne. The jump autogyro therefore may take off vertically and continue to fly after takeoff. The jump autogyro air module has a single configuration in flight.

The autogyro air module is modular and may support a ground module in flight, just as a ducted fan air module or an open rotor air module may support a ground module. The control and other systems of the jump autogyro air module operate as do the equivalent systems of the ducted fan and open rotor air modules. The autogyro, ducted fan and open rotor air modules may be used interchangeably with a ground module.

4. Multiple Air Modules Carrying a Single Load

The ability of an air module to support a load in flight is limited by the capabilities of the air module; however, two or more air modules may cooperate to transport a single load that is too large or too heavy to be transported by a single air module. The number of air modules that may be attached to a load is limited only by the space physically available on the load for attachment of the air modules. For large or heavy loads, the air modules may be attached to a interconnecting structure and the load supported by the interconnecting structure. The twin ducted fan or twin open rotor air modules described above may fly in any of the tandem, side-by-side or tilted-rotor configurations when two or more of those air modules are cooperating to transporting a large or heavy load.

The autopilot control systems of the two or more air modules cooperate to coordinate control among all of the air modules supporting the large or heavy load.

5. Control System

The autopilot control system of the air module is housed in the central unit of the unmanned air module. The autopilot control system includes a microprocessor, computer memory, data links, sensors and control effectors. The autopilot control system allows a mission plan to be pre-programmed into the computer memory, including waypoints and landing zone location. A human operator at a remote location or in the ground module may change the mission plan, waypoints or landing zone location during flight. The autopilot control system allows the air module to operate autonomously and independently of a ground module.

The air module control system allows the air module or the air module and ground module combination to transition among the first, second and third configurations 'in stride.' As used in this document, the term 'in stride' means that the air module may transition among the tandem rotor configuration, the side-by-side rotor configuration and the tilted-rotor configuration starting during hover or low speed flight or during on-road travel by the air module and ground module combination. While traveling on the ground, the air module and ground module combination may transition to the third (tilted-rotor) configuration, take off, fly and land as a short takeoff and landing (STOL) aircraft.

The air module can be configured to fly autonomously, including flying autonomously to a safe location after disengaging with the ground module, flying to and re-engaging with the ground module when needed, autonomously engaging with and transporting cargo containers, and autonomously engaging and transporting medical transportation units, such as to evacuate a wounded soldier from a battlefield. The air module also may operate under manual human control, in a fly-by-wire configuration or by remote control.

6. Active Center-of-Gravity Control

The air module or ground module may be equipped with active center of gravity (CG) control. The CG control detects changes in the center of gravity of the airborne aircraft, such as by soldiers and equipment embarking and disembarking from the ground module while the aircraft is in hover, and adjusts the CG accordingly to maintain the commanded attitude of the aircraft. Attitude sensors detect the attitude of the aircraft and supply the attitude information to the microprocessor. The microprocessor compares the detected attitude to the commanded attitude of the aircraft. If there is a discrepancy, the microprocessor activates actuators and adjusts the relative position of the center of lift and the center of gravity to restore the commanded attitude.

Center of gravity adjustment may involve moving the center of gravity with respect to the center of lift by moving the ground module with respect to the air module so that the center of gravity of the aircraft, its load and it occupants is directly below the center of lift of the rotor(s) and wing when the aircraft is flying at the commanded attitude.

Alternatively, active CG control may take the form of moving the center of lift of the air module with respect to the ground module. For example, differential collective pitch applied to the rotors of the two rotor embodiment having three configurations will adjust the center of lift along the rotor axis of tilt. For the open rotor air module and gyrocopter air module, active CG control may involve moving the rotor with respect to the air module, as by tilting the rotor pylon or traversing the rotor attach point. Lateral CG errors are as well managed by the use of a mechanical motion to displace the center of lift to meet the line of action imparted by the lift system directly thru the center of gravity.

Active CG control also can raise or lower the ground module with respect to the air module, allowing CG control in three dimensions.

Active CG control may include both moving the center of gravity and moving the center of lift.

7. Rotor Configuration

The air module may be equipped to change the configuration of the rotor, particularly of open rotor or autogyro air modules for takeoff and landing. The rotor mast of an open rotor or autogyro air module may be extended to provide additional ground clearance to avoid injury to persons near the air module and damage to the rotors during takeoff or landing.

The rotor blades of the open rotor or autogyro air module may be telescoping or otherwise extendable to allow changes in diameter of the rotor disc. The use of extendable rotor blades allows the air module to be transportable over the road, as when the air module is supported by the operating ground vehicle module, with the rotor blades in the contracted or non-extended position. When the rotor disc is in the contracted or non-extended position, the rotor presents a smaller cross section and allows the air module to avoid obstacles on the ground. By extending the blades, the area of the rotor disc is increased, allowing better vertical flight performance than could otherwise be achieved with the smaller radius of the retracted system.

The rotor blades of the open rotor air module or the autogyro air module may be foldable, as is known in the art, so that the air module presents a smaller cross section while traveling on the ground and to avoid obstacles on the ground.

In an example application of the invention, a twin ducted fan air module is attached to vehicle ground module. The air module is unmanned and is programmed to transports soldiers occupying the ground vehicle module on a mission. The air module takes off in the side-by-side configuration and the air module autopilot follows a pre-determined mission plan to a pre-selected location along pre-selected way points. For higher speed and longer range, the air module transitions to the tilted-rotor configuration during flight. The soldiers alter the mission plan in flight by selecting an alternative landing point in an urban area. The air module transitions to the tandem rotor configuration during flight and the air module and ground module combination lands at the selected urban landing zone. The air module and ground module disengage and the air module takes off. The soldiers in the ground module drive the ground vehicle module over the ground to the objective. The air module may fly overhead and communicate with the soldiers in the ground vehicle module to provide surveillance or airborne weapons support or may fly to a predetermined safe landing zone and await instructions. Upon command, the air module flies to the location of the ground module, reattaches to the ground module and transports the vehicle ground module and the soldiers back to base.

IV. BRIEF DESCRIPTION OF THE DRAWINGS

V. DESCRIPTION OF AN EMBODIMENT

The invention is an air vehicle having at least one rotary wing 4. The air vehicle may be modular and may transition between different configurations while still providing transportation function.

A. Two Rotor Embodiment having Three Configurations

Figure 1:
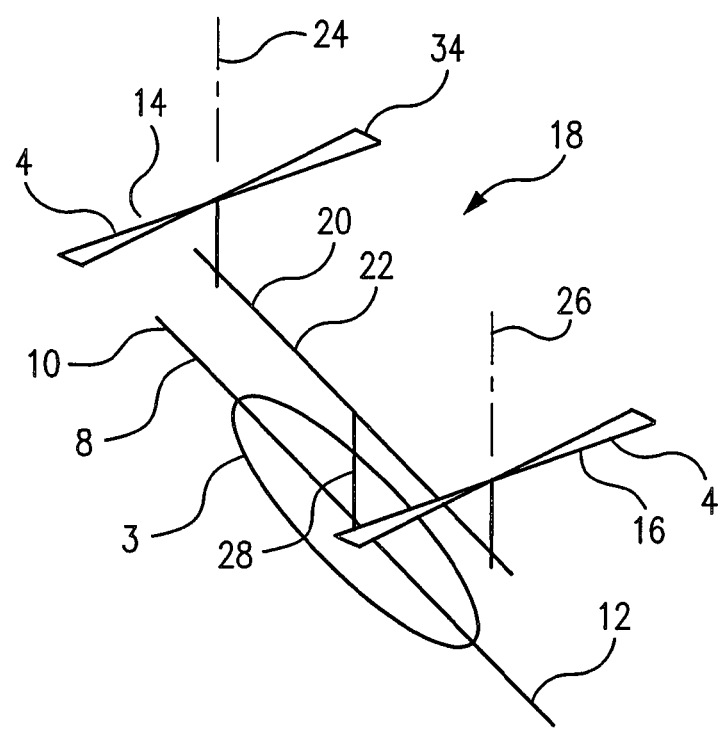
FIG. 1 is a perspective schematic drawing of the twin rotor, three configuration embodiment in the tandem rotor configuration.
Figure 2:
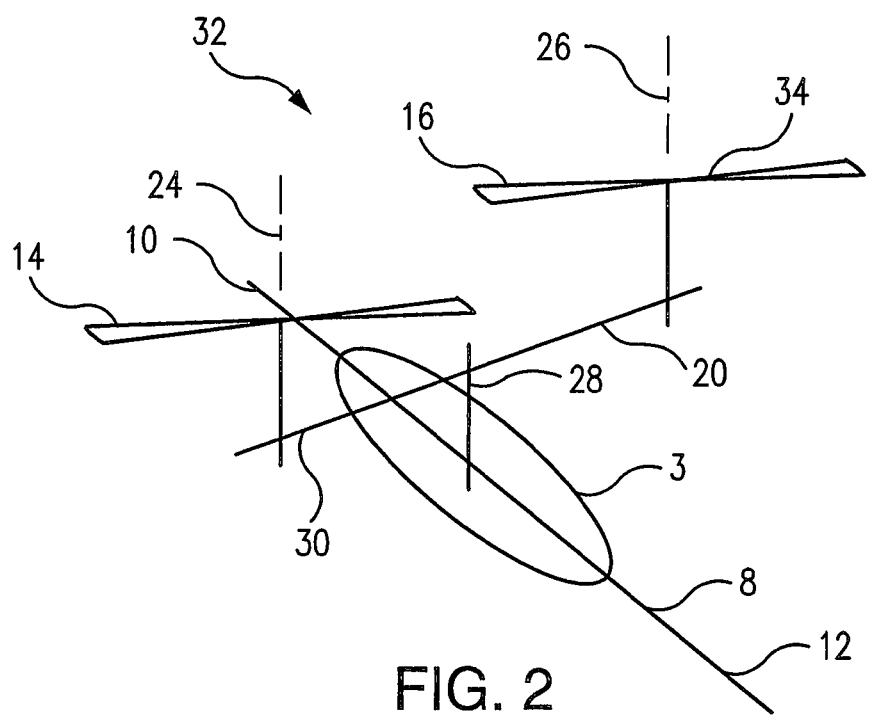
FIG. 2 is a perspective schematic drawing of the twin rotor, three configuration embodiment in the side-by-side rotor configuration.
Figure 3:
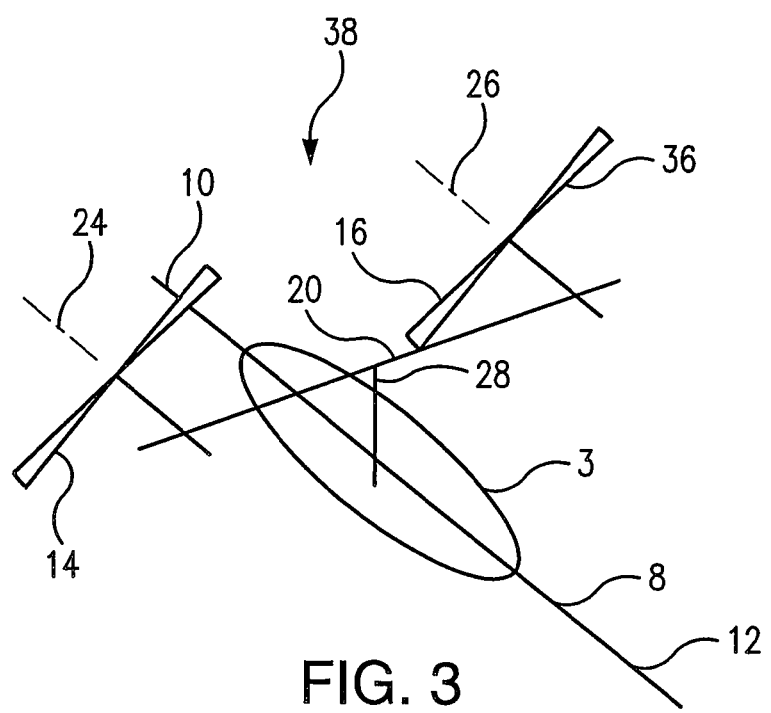
FIG. 3 is a perspective schematic drawing of the twin rotor, three configuration embodiment in the tilted-rotor configuration.

FIGS. 1, 2 and 3 illustrate the elements for a twin rotor air vehicle that can transition between three different configurations. The twin rotor embodiment includes a fuselage 3 and a first rotor 14 and a second rotor 16. The first rotor 14 and the second rotor 16 are configured to support the fuselage 3 in flight. The twin rotor air vehicle may be modular, in which case the first and second rotors 14, 16 along with the drive and control system for the rotors 14, 16 define an air module 2 and the fuselage 3 defines a ground module 6, as shown by FIGS. 4 through 8 and discussed below. The air module 2 and the ground module 6 may be selectably detached.

The fuselage 3 defines a longitudinal axis 8 in a fore and aft direction 10, 12 and generally oriented along a preferred direction of flight for the fuselage 3.

The first rotor 14 has a first rotor axis of rotation 24 and the second rotor 16 has a second rotor axis of rotation 26, about which the first and second rotors 14, 16 are configured to rotate. The first and second rotor axes of rotation 24, 26 are in a spaced-apart relation along an axis of rotor tilt 20. The first and second rotor axes of rotation 24, 26 generally are parallel and together generally define a plane.

The axis of rotor tilt 20 may rotate selectably about a translation axis 28 between the tandem position 22 shown by FIG. 1, in which the axis of rotor tilt 20 is parallel to the longitudinal axis 8, and the side-by-side position 30 shown by FIG. 2 in which the axis of rotor tilt 20 is generally normal to the longitudinal axis 8. When the first and second rotor axes of rotation 14, 16 are in the side-by-side position 30, the plane generally defined by the first and second rotor axes of rotation 14, 16 is generally normal to the longitudinal axis 8. The first and second rotor axes of rotation 14, 16 are configured to move selectably between a vertical position 34, shown by FIGS. 1 and 2, and a horizontal position 36, shown by FIG. 3.

The first and second rotors 14, 16 are configured to move between three different flight configurations. The first flight configuration is the tandem rotor configuration 18 shown by FIG. 1. When the axis of rotor tilt 20 is in the tandem position 22 and the rotor axes of rotation are in the vertical position 34, the first and second rotors 14, 16 are in the tandem rotor configuration 18. In the tandem rotor configuration 18, the first and second axes of rotation 24, 26 are generally normal to and generally intersect the longitudinal axis 8 and the longitudinal axis 8 generally falls on the plane defined by the first and second rotor axes of rotation 8. The air vehicle can fly in the tandem rotor configuration 18 as a rotary wing aircraft.

The second flight configuration is the side-by-side rotor configuration 32 shown by FIG. 2. From FIG. 2, the air module 2 is in a side-by-side rotor configuration 32 when the axis of rotor tilt 20 is in the side-by-side position 30 and the first and second axes of rotation 24, 26 of the first and second rotors 14, 16 are oriented in a vertical position 34. When the air vehicle is in the side-by-side rotor configuration 32, the plane defined by the first and second axes of rotation 24, 26 of the first and second rotors 14, 16 is generally normal to the longitudinal axis 8. The air vehicle can fly as a rotary wing aircraft when the air module 2 is in the side-by-side rotor configuration 32 and when the air module 2 is translating between the tandem rotor configuration 18 and the side-by-side rotor configuration 32.

The third flight configuration is the tilted-rotor configuration 38 shown by FIG. 3. The air vehicle is in the tilted-rotor configuration 38 when the axis of rotor tilt 20 is in the side-by-side position 30 and the first and second rotor axes of rotation 24, 16 are in the horizontal position 36, all as shown by FIG. 3. When the first and second rotors 14, 16 are in the tilted-rotor configuration 38, the plane defined by the first and second axes of rotation 24, 26 is generally parallel to the longitudinal axis 8.

In the tilted-rotor configuration 38, the air module 2 flies as a fixed-wing aircraft with the rotors 14, 16 acting as propellers urging the air module 2 through the air. To fly as a fixed-wing aircraft, the air module 2 must have a wing 40, as described below relating to FIGS. 5, 6, 8, and 9 through 11.

B. Modular Two Rotor Ducted Fan Embodiment

FIGS. 4 through 8 illustrate a twin rotor ducted fan embodiment of the air module 2. As shown by FIGS. 4 through 8, first rotor 14 may be surrounded by a first circular duct 42 and second rotor 16 may be surrounded by a second circular duct 44 to form a first ducted fan 46 and a second ducted fan 48. The use of ducted fans 46, 48 allows the first rotor 14 and second rotor 16 to generate more thrust for a given rotor 14, 16 diameter than otherwise would be possible. The first and second circular ducts 42, 44 also serve to protect rotors 14, 16 from damage.

In each embodiment and all configurations, a central unit 50 houses the engine(s) to power the rotors 14, 16. The central unit 50 houses the engine(s), drive system for the two ducted fans 46, 48, starter batteries, flight avionics, optional sensors, communications relays and autopilot control system.

Figure 5:
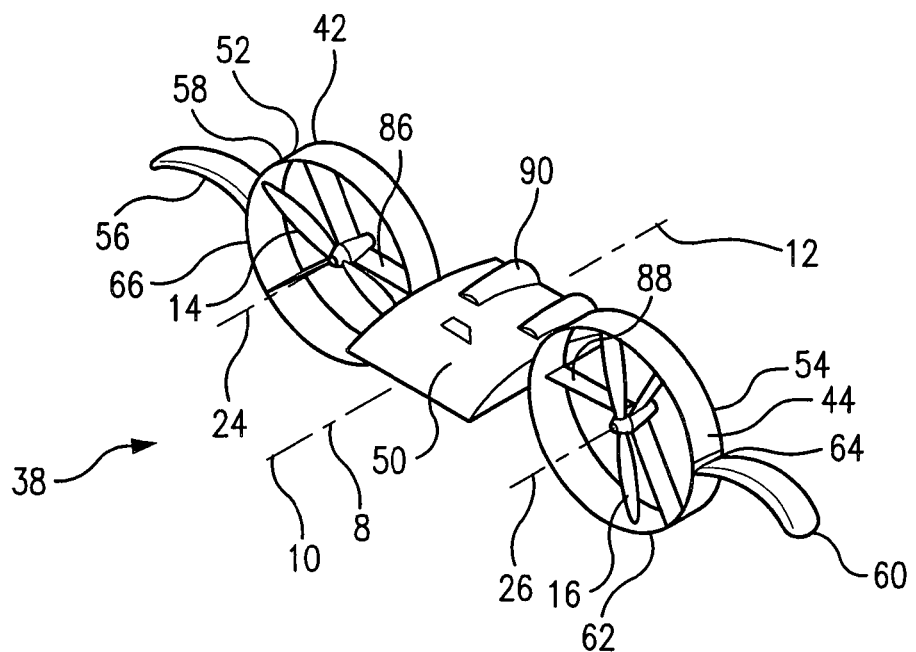
FIG. 5 is a perspective view of the twin rotor ducted fan air module in the tilted-rotor configuration.
Figure 6:
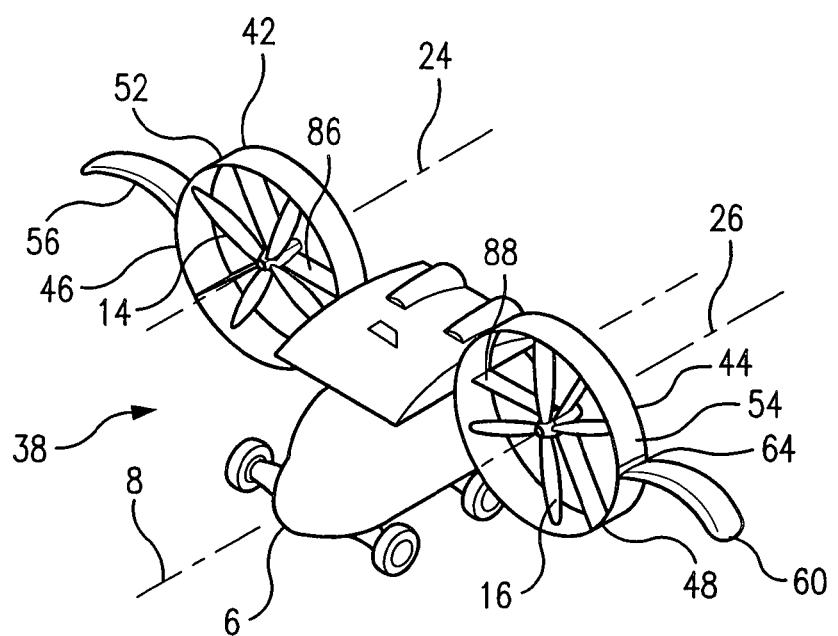
FIG. 6 is a perspective view of the twin rotor, three configuration air module in the tilted-rotor configuration with a vehicle ground module attached.
Figure 8:
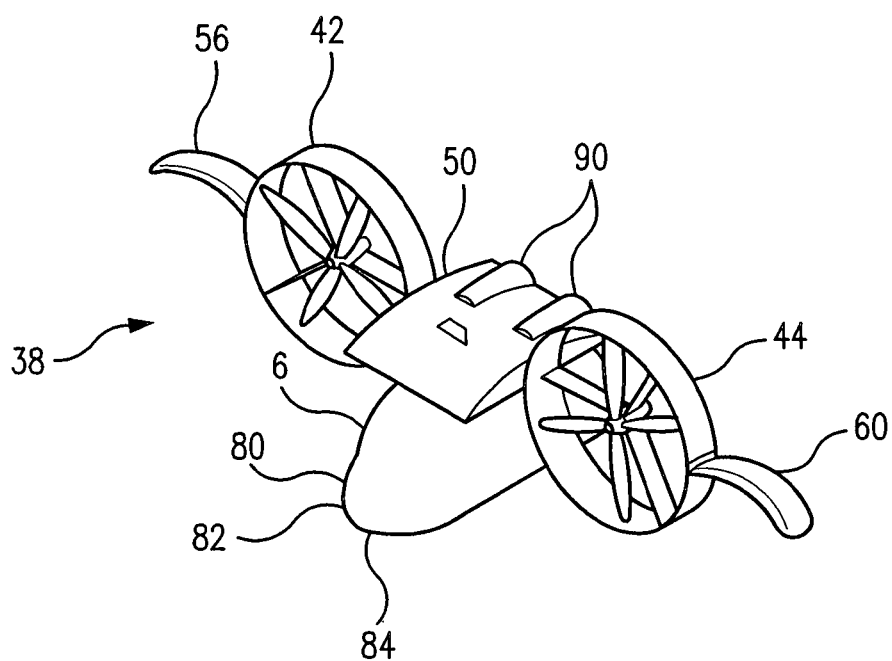
FIG. 8 is a perspective view of the twin rotor, three configuration air module in the tilted-rotor configuration with a different ground module attached.

In the tilted-rotor configuration 38 illustrated by FIGS. 5, 6 and 8, the first circular duct 46 acts as a first circular wing 52 and the second circular duct 48 acts as a second circular wing 54. Circular wings 52 and 54 provide lift to the air module 2 to support the air module 2 in the air when the air module 2 is in the tilted-rotor configuration 38 and is moving in the direction of the longitudinal axis 8.

As shown by FIGS. 5, 6, and 8, a first wing extension 56 may be attached to an outside 58 of the first circular duct 42 and a second wing extension 60 may be attached to an outside 62 of the second circular duct 44. The first and second wing extensions 56, 60 provide additional lift to support the air module 2 in the air when the air module 2 is in the tilted-rotor configuration 38. The first and second wing extensions 56, 60 may fold about a hinge 64 between a deployed position (shown by FIGS. 5, 6 and 8) and a retracted position (shown by FIG. 7) to reduce the size of the air module 2 when the first and second wing extensions 56, 60 are not in use. The first and second wing extensions 56, 60 may be arcuate in shape and may conform to the periphery 66 of the circular ducts 42, 44 for compact size in the retracted position.

Figure 4:
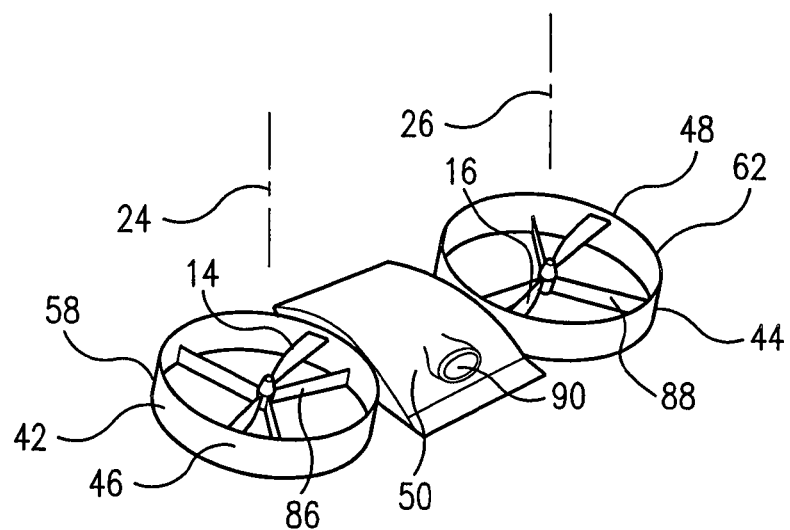
FIG. 4 is a perspective view of the twin rotor ducted air module in rotary wing flight without a ground module attached.

FIGS. 4 through 8 also illustrate the modular nature of the air vehicle. FIGS. 4 and 5 illustrate an air module 2 in flight without a ground module 6 attached. In FIG. 4, the air module 2 is flying as a rotary wing aircraft. The air module 2 is supported by lift generated by the first and second rotors 14, 16 acting as rotary wings 4.

FIG. 5 illustrates the air module 2 flying in the tilted-rotor configuration 38 without a ground module 6 attached, with wings 40 providing lift to support the air module 2. First and second rotors 14, 16 act as propellers to urge the air module 2 through the air.

FIGS. 6 and 8 illustrate the air module 2 flying in the tilted-rotor configuration 38 with a ground module 6 attached, with the circular wings 52,54 and wing extensions 56, 60 providing lift to support the air module 2 and ground module 6. The air module 2 also may support the ground module 6 in flight in the tandem rotor configuration 18 and the side-by-side rotor configuration 32, with the first and second rotors 14, 16 acting as rotary wings 4 to provide the required lift.

Figure 7:
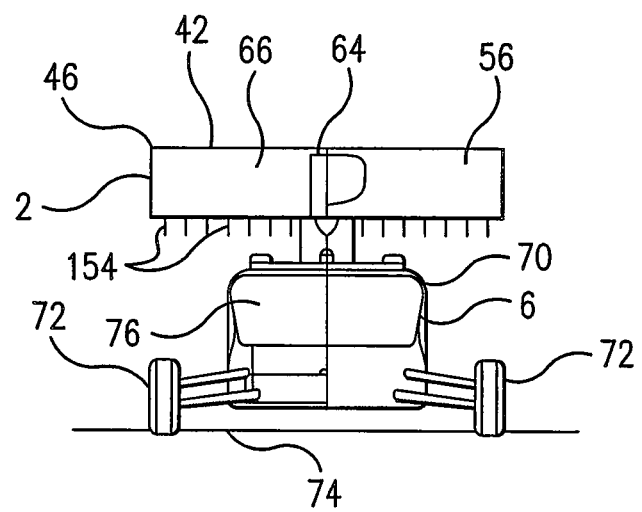
FIG. 7 is a front view of the twin rotor, three configuration air module with a vehicle ground module attached and on the ground.

FIG. 7 illustrates the air module 2 attached to a ground module 6 in the tandem rotor configuration 18 while on the ground 74, with the ground module 6 supporting the air module 2 above the ground 74.

C. Two Open Rotor Embodiment

Figure 9:
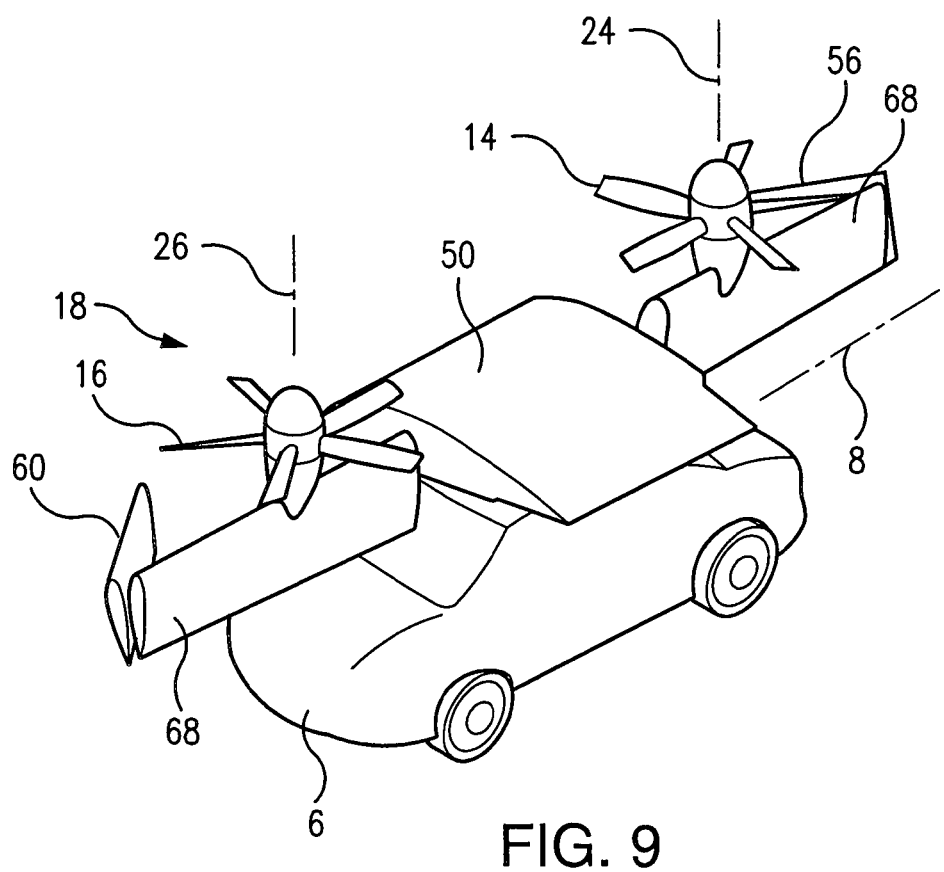
FIG. 9 is a perspective view of the open rotor twin rotor air module in the tandem rotor configuration with a vehicle ground module attached.
Figure 10:
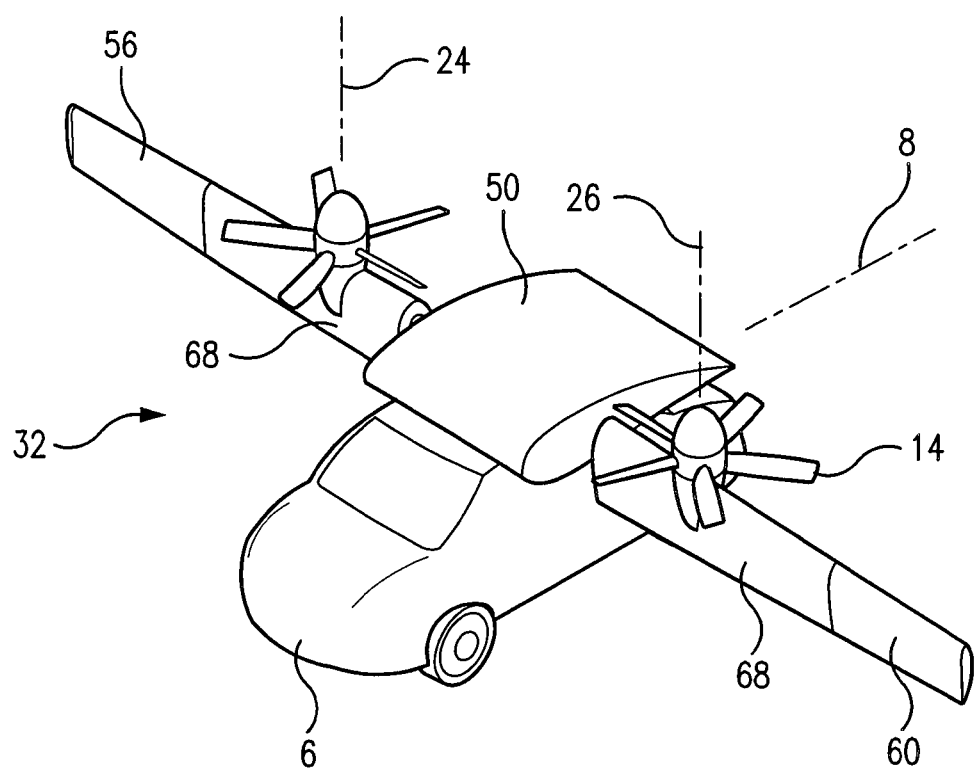
FIG. 10 is a perspective view of the open rotor twin rotor air module in the side-by-side rotor configuration with the vehicle ground module attached.
Figure 11:
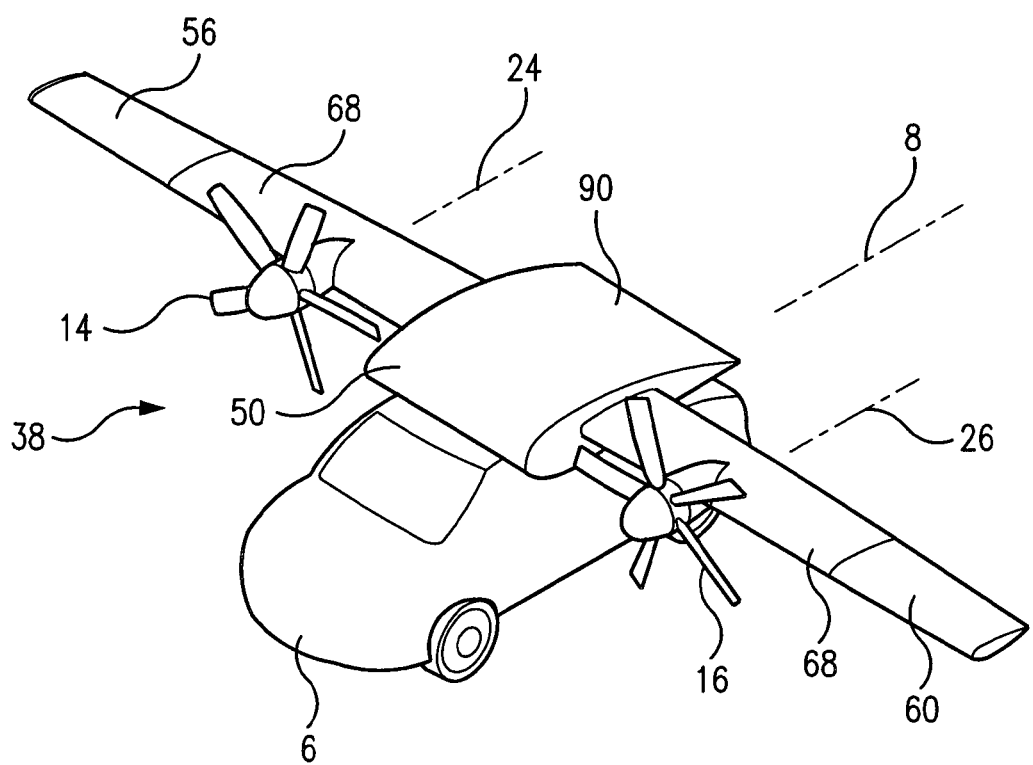
FIG. 11 is a perspective view of the open rotor twin rotor air module in the tilted-rotor configuration with the vehicle ground module attached.

An open rotor 66 embodiment of the air module 2 having two rotors 14, 16 and three rotor configurations is illustrated by FIGS. 9 through 11. The open rotor 66 embodiment dispenses with the circular ducts 42, 44 of the ducted fan 46, 48 embodiment. The first and second rotors 14, 16 may move through the same three rotor configurations 18, 32, 38 as the ducted fan 46, 48 embodiment of FIGS. 4 through 8. FIG. 9 illustrates the open rotor 66 air module 2 in the tandem rotor configuration 18. FIG. 10 illustrates the open rotor air module 2 in the side-by-side rotor configuration 32. FIG. 11 illustrates the open rotor air module 2 in the tilted-rotor configuration 38. The open rotor 66 embodiment operates in the same manner as the twin ducted fan embodiment discussed above, except as follows.

The open rotor 66 embodiment does not feature circular ducts 44, 46 and hence does not have circular wings 52, 54. Instead, the open rotor 66 embodiment has a tilt wing 68 with a chord oriented generally parallel to the first and second rotor axes of rotation 24, 26. When the air module 2 is flying in the tandem rotor configuration 18 shown by FIG. 9 or the side-by-side rotor configuration 42 shown by FIG. 10, the vertical orientation of the chord of the tilt wing 68 reduces downwash effects from the rotors 14, 16 against tilt wing 68. When the air module 2 is transitioning to the tilted-rotor configuration 38 illustrated by FIG. 11, the tilt wing 68 tilts about the axis of rotor tilt 20 so that the chord of the tilt wing 68 is parallel to the longitudinal axis 8. In the tilted-rotor configuration 38, the tilt wing 68 provides lift to support the air module 2 and the ground module 6 in the air.

The tilt wing 68 may be provided with a first wing extension 56 and a second wing extension 60. The first and second wing extension 56, 60 may fold about hinge 64 to the retracted position to reduce the size of the air module 2 when the wing extensions 56, 60 are not in use, as illustrated by FIGS. 9 and 10. The wing extensions 56, 60 may be extended to the deployed position, illustrated by FIG. 11, extending the span and wing area of tilt wing 68 to provide additional lift to the air module 2 when the air module 2 is in the tilted-rotor configuration 38.

Rotors 14, 16 for both the twin open rotor 66 embodiment and the twin ducted fan embodiment may be tilted to either side of vertical when the rotors 14, 16 are in the tandem rotor position 18 and the side-by-side rotor configuration 32 to provide active center of gravity (CG) control. In this configuration, the tilt of the rotors is the CG actuator illustrated by FIG. 21.

The open rotor air module 2 may dispense with the tilt wing 68, and hence with the tilted-rotor configuration 18, in which case the air module 2 may fly as a rotary wing aircraft in only the tandem rotor configuration 18 or the side-by-side rotor configuration 32. The air module 2 having two open rotors 68 also may operate in positions intermediate to the tandem rotor and side-by-side rotor configurations 18, 32.

D. Ground Module

The air module 2, whether ducted fan or open rotor, may support an attached ground module 6 in flight. When the ground and air modules 6, 2 are attached and on the ground 74, the ground module 6 may support the air module 2, as shown by FIG. 8. A ground module 6 may include a crew cabin 76 and be configured to accommodate one or more human beings. For ground modules 6 that are so configured, the unmanned air module 2 will support the attached ground module 6 and its human occupants in flight.

The ground module 6 may be a vehicle ground module 70, as illustrated by FIGS. 6, 7 and 8 through 11. The vehicle ground module 70 is configured to move under its own power across the surface of the ground 74 either with the air module 2 attached or separately from the air module 2. The vehicle ground module 70 is configured to contain one or more human beings, such as one or more soldiers, and their equipment in a crew cabin 76 while it moves across the ground 74. The vehicle ground module 70 includes wheels 72 that support the vehicle ground module 70 on the surface of the ground 74. The vehicle ground module 70 include one or more motors, such as one or more electric motors, to turn one or more of the wheels 72 and also includes batteries to power the motors. The vehicle ground module 70 may move across the ground under battery power alone. The vehicle ground module 70 may include an internal combustion engine and associated electrical generating system to extend the range of the vehicle ground module 70. Alternatively, a conventional internal combustion engine may drive one or more wheels 72 directly through a conventional transmission or transaxle. Any conventional system known in the automotive art to drive one or more wheels 72 of the vehicle ground module 70 is contemplated by the invention.

The vehicle ground module 6 shares a separable fuel system with the air module 2 and the fuel stored on either the air module 2 or the vehicle ground module 70 may be used to supply the other. The vehicle ground module 70 also shares a separable electrical system with the air module 2 and the air module turbine engine(s) 90 can supply supplemental electrical power to the vehicle ground module wheels 74. The air module 2 electrical power can be used to provide directional control to the ground module 6 by applying differential power to the ground module 6 wheels, resulting in skid steering.

When the vehicle ground module 70 and air module 2 are engaged, the electrical power systems of the two modules 70, 2 are joined. Electrical power generated by the engines 90 of the air module 2 may be used to charge batteries of the vehicle ground module 70, drive the wheels 74 of the vehicle ground module or start the engine of the vehicle ground module 70. Conversely, the batteries or engine of the vehicle ground module 70 may power the starting of the engines 90 of the air module 2.

From FIG. 8, the ground module 6 may be a medical module 20 and may be configured to contain one or more human patients, such as wounded soldiers on a battlefield, and one or more human attendants. The medical module 20 may be equipped with systems to treat and sustain the one or more patients until the air module 2 delivers the medical module 20 and the patients to a care facility.

Also from FIG. 8, the ground module 6 may be a cargo module 22 configured to transport any desired cargo through the air. The ground module 22 may be a weapons module 24 configured so that the air module 2 and weapons module 24 in combination provide a remotely operated aerial weapon. The weapons module 24 may include conventional communications and targeting systems to allow a remote operator, such as a soldier in a vehicle ground module 20, to select a target on the ground 74 and to destroy the target using the air module 2 and weapons module 24 combination. The weapons module 24 may include a supplemental fuel supply to allow the air module 2 and weapons module 24 combination an extended loiter time over a target area. The ground module may be a passenger module configured to carry human passengers or may be a communications module equipped to accommodate communications systems.

E. Two Rotor Embodiment having Monocyclic Pitch and Torsion Beams

Figure 13:
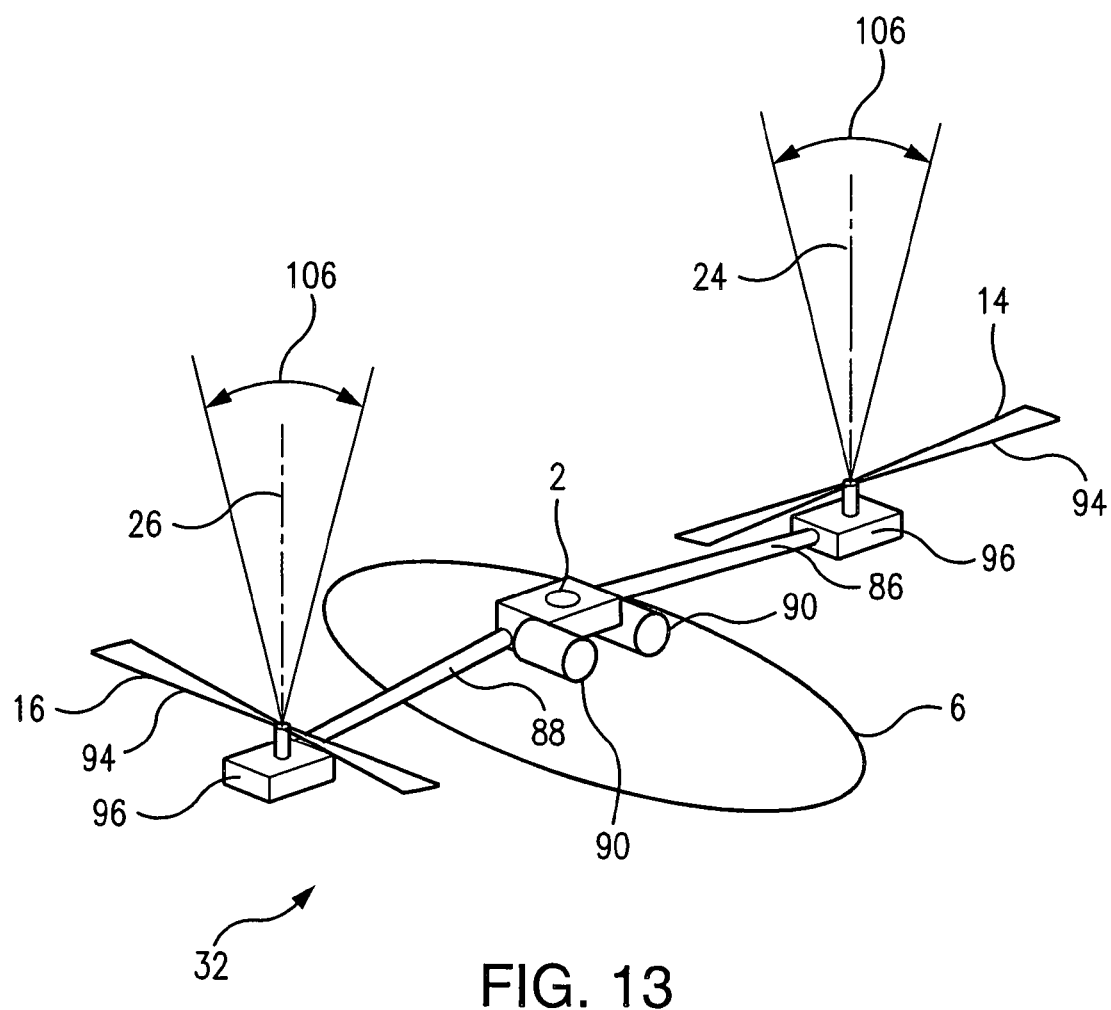
FIG. 13 is a perspective schematic view of the twin rotor air module and ground module combination having a torsion beam and monocyclic pitch in the side-by-side rotor configuration.
Figure 14:
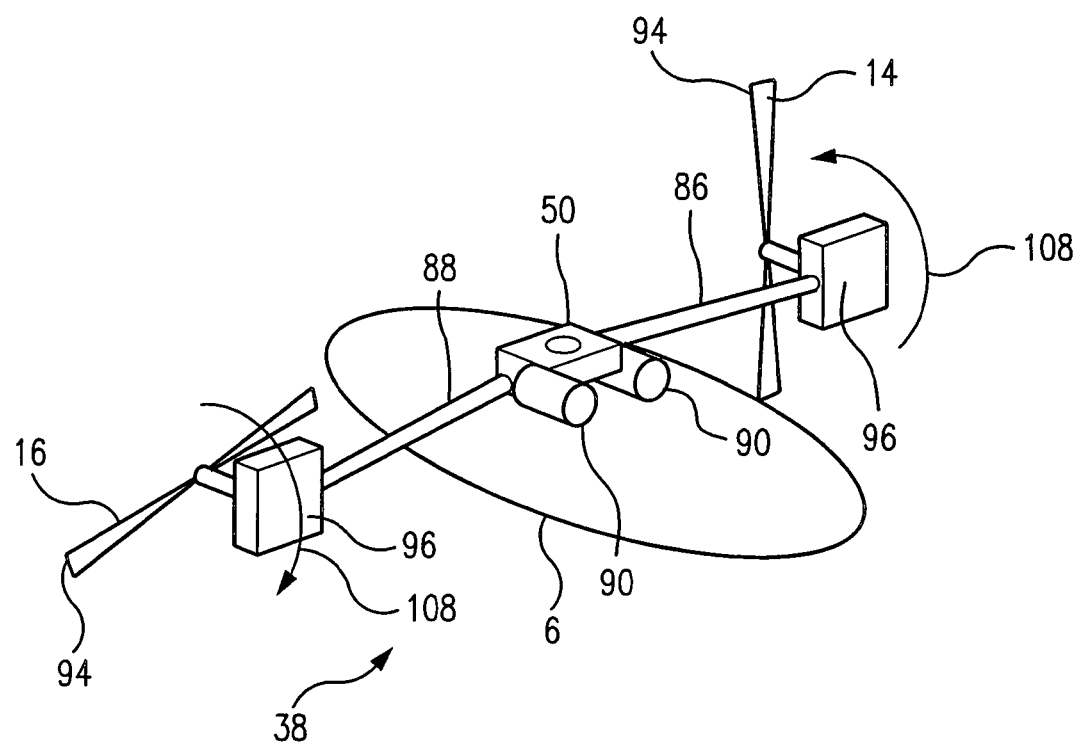
FIG. 14 is a perspective schematic view of the twin rotor air module and ground module combination having a torsion beam and monocyclic pitch in the tilted-rotor configuration.

The two rotor embodiments capable of transition among the tandem rotor configuration 18, the side-by-side rotor configuration 32 and the tilted-rotor configuration 38 must provide control in the yaw, pitch and roll axes for all three configurations 18, 32, 38. Control in all three axes in all three configurations is achieved by providing the first and second rotor 14, 16 with monocyclic pitch in a direction normal to the axis or rotor tilt 20 and by mounting the rotors 14, 16 on flexible torsion beams 86, 88, all as shown by FIGS. 12 through 14.

Figure 12:
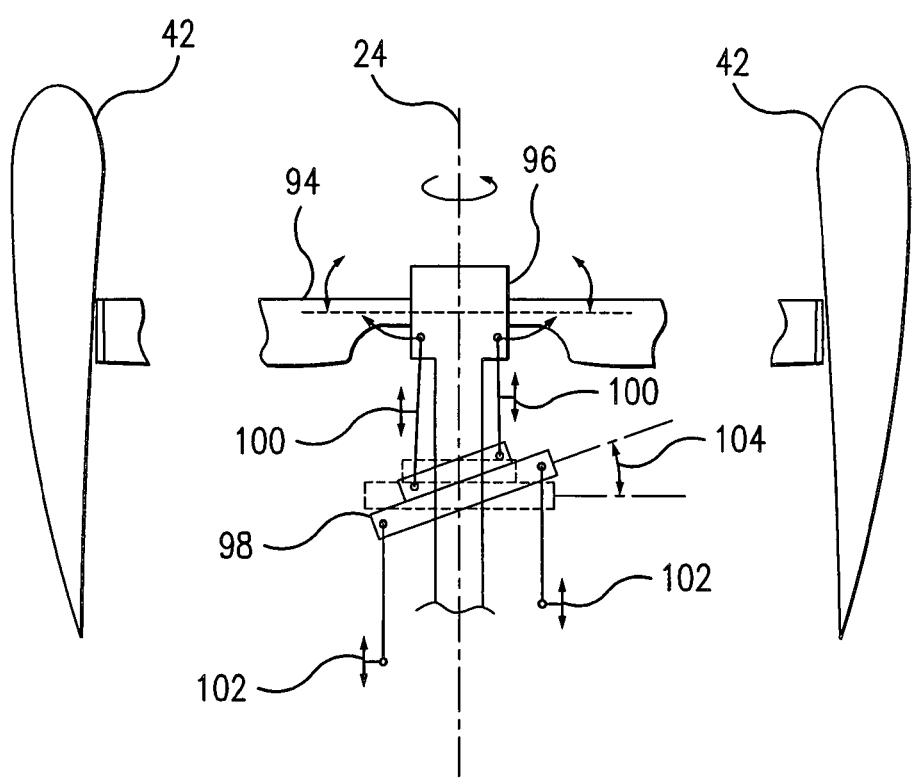
FIG. 12 is a detail cross section view of a ducted fan.

FIG. 12 illustrates how pitch control is applied to a blade 94 of a rotor 14, 16. FIG. 12 shows a ducted fan embodiment, but the explanation applies equally to open rotor embodiments. First rotor 14 features a first circular duct 42 and a rotor blade 94. Rotor blade 94 is attached to a hub 96 with a pivoting blade mount and rotates about the first rotor axis of rotation 24. The pitch of blade 94 can vary as the blade rotates about the hub 96. Blade 94 pitch is determined by a first swashplate 98 that rotates with the blade 94. The swashplate 98 is capable of being tilted at a swashplate angle 104 as it rotates. A pitch link 100 between the swash plate 98 and the blade 94 translates the changing angle 104 of the swashplate 98 as it rotates into a changing pitch of the rotating blade 94. For monocyclic pitch control, two control input pushrods 102 determine the swashplate angle 104 so that the change in blade 94 pitch caused by the swashplate angle 104 is greatest when the blade 94 is farthest away from the axis of rotor tilt 20 during the rotation of the blade 94 and the change in blade 94 pitch caused by the swashplate angle 104 is substantially zero when the blade 94 is parallel to the axis of rotor tilt 20. For monocyclic pitch control, the change in blade 94 pitch caused by the swashplate 98 tilt applies a torque to the hub 96 and hence to the rotor 14, 16 parallel to the axis of rotor tilt 20.

The hub 96 is attached to the central unit 50 of the air module 2 by the first flexible torsion beam 86. The torque applied to the hub 96 applies a pre-determined torsion load to the first flexible torsion beam 86, which has a pre-determined resilience in torsion, causing a pre-determined angular deformation of the first flexible torsion beam 86. The angular deformation of the first flexible torsion beam 86 causes a pre-determined change in the angle of tilt of the rotor axis of rotation 24, 26 about the rotor tilt axis 20. The change in the tilt of the rotor axis of rotation 24, 26 changes the direction of thrust of the rotor 14, applying a predetermined yaw or roll moment to the aircraft.

The second rotor 16 has a second swashplate 110 that determines a second monocyclic pitch of the second rotor 16. The second rotor 16 operates in the same manner as the first rotor 14. The monocyclic pitch of the second rotor 16 applies a predetermined second torsion load to the second flexible torsion beam 88, causing a predetermined angular deformation of the second flexible torsion beam 88 and a pre-determined change in the direction of thrust of the rotor 16. The first and second rotors 14, 16 cooperate to apply a predetermined yaw or rolling moment to the aircraft.

FIGS. 13 and 14 illustrate the application of the effects described above relating to FIG. 12. As described above, rotors 14, 16 are rigid, meaning that the rotor blades do not flap, lead or lag. FIG. 13 shows the ground module 6 and air module 2 in the side-by-side rotor configuration 32. Ground module 6 is attached to air module 2. Engines 90 generate power that is transmitted to rotors 14, 16. Rotors 14, 16 and ground module 6 are supported with respect to each other by flexible torsion beams 86, 88, which are resiliently flexible in torsion. When differential monocyclic pitch is applied to rotors 14, 16, the rotors 14, 16 apply torsion to the torsion beams 88. Torsion of the torsion beams 86, 88 allows the rotors 14, 16 and circular ducts 42, 44 to deflect differentially, so that the first and second rotor axes of rotation 24, 26 move within a degree of freedom shown by arrows 106. The deflection of the torsion beams 86, 88 tilts the rotors 14, 16 in opposite directions, applying a yawing moment to the air module 2 and ground module 6 combination, controlling yaw.

When non-differential cyclic pitch is applied to both rotors 14, 16, the torque applied to the torsion beams 86, 88 assists in moving the rotors 14, 16 from the side-by-side configuration 32 to the tilted-rotor configuration 38, allowing smaller and lighter control effectors to be used for that task FIG. 14 shows the ground module 6 and air module 2 in the tilted-rotor configuration 38. Differential monocyclic pitch applied to rotors 2 applies torsion to flexible torsion beams 86, 88, which allow the rotors 14, 16 to tilt in the direction indicated by arrows 108. The differential tilt of the rotors 2 applies a rolling moment to the ground module 6 and air module 2 combination, controlling roll.

F. Two or more Air Modules Acting in Cooperation

Two or more air modules 2 may be joined together to lift and transport loads, that are too heavy or too large for a single air module 2, as illustrated by FIGS. 15 through 19.

Two or more air modules 2 may be attached to a single ground module 6 so that the ground module 6 becomes the physical connection between the air modules 2. The air modules 2 may fly independently to the ground module 6, join to the ground module 6, and lift the ground module 6 as a single aircraft comprising the two air modules 2 and the ground module 6. In two or more air module 2 configurations, the control systems of the air modules 2 are operably joined so that the two or more air modules 2 operate as a single aircraft when supporting the ground module 6.

Figure 15:
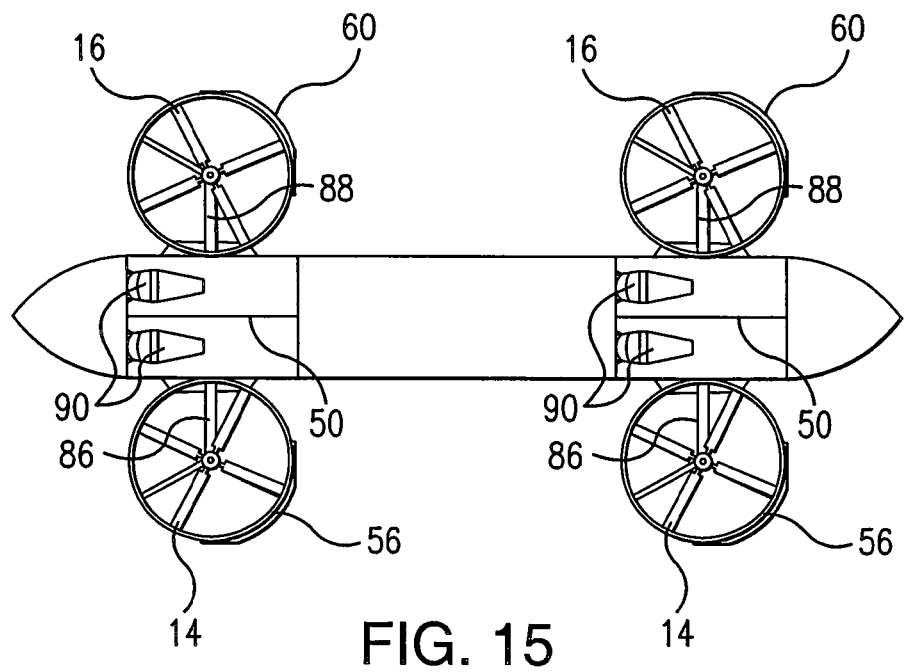
FIG. 15 is a plan view of a two air module embodiment in the side-by-side rotor configuration.
Figure 16:
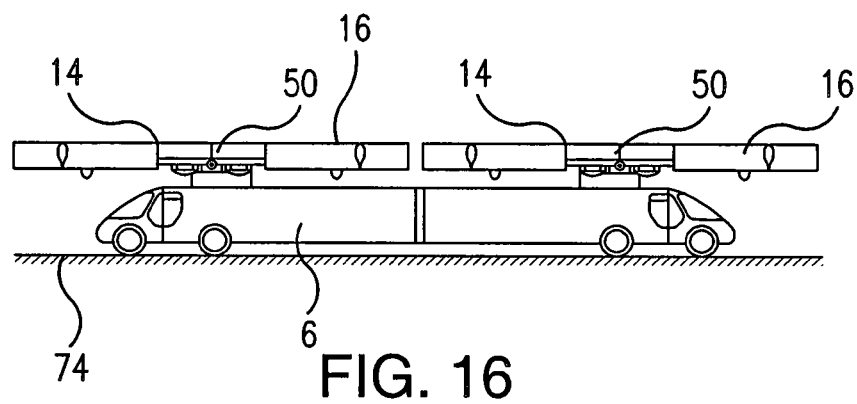
FIG. 16 is a side view of a two air module embodiment in the tandem rotor configuration.
Figure 17:
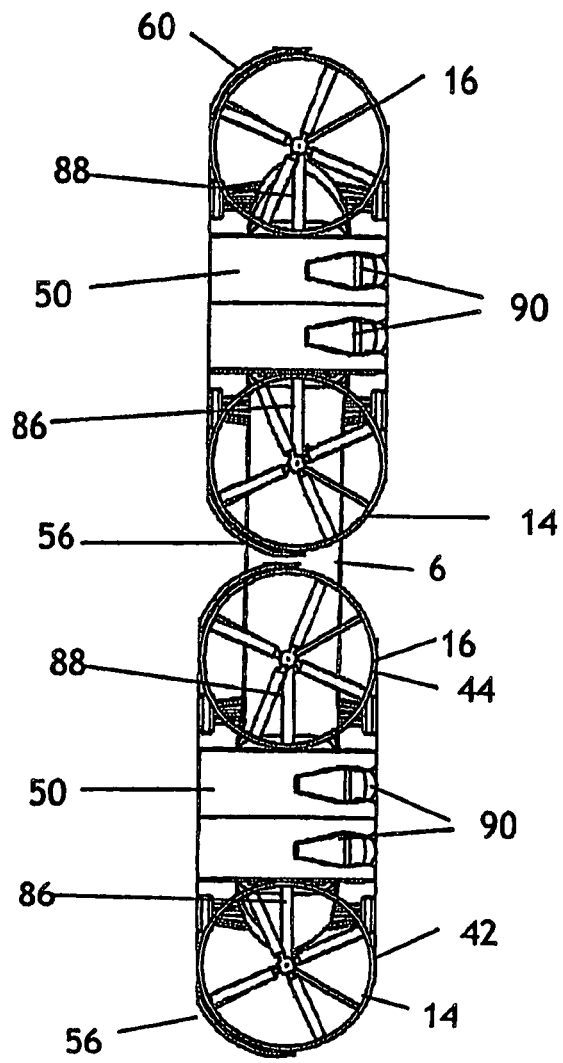
FIG. 17 is a plan view of the two air module embodiment in the tandem rotor configuration.
Figure 18:
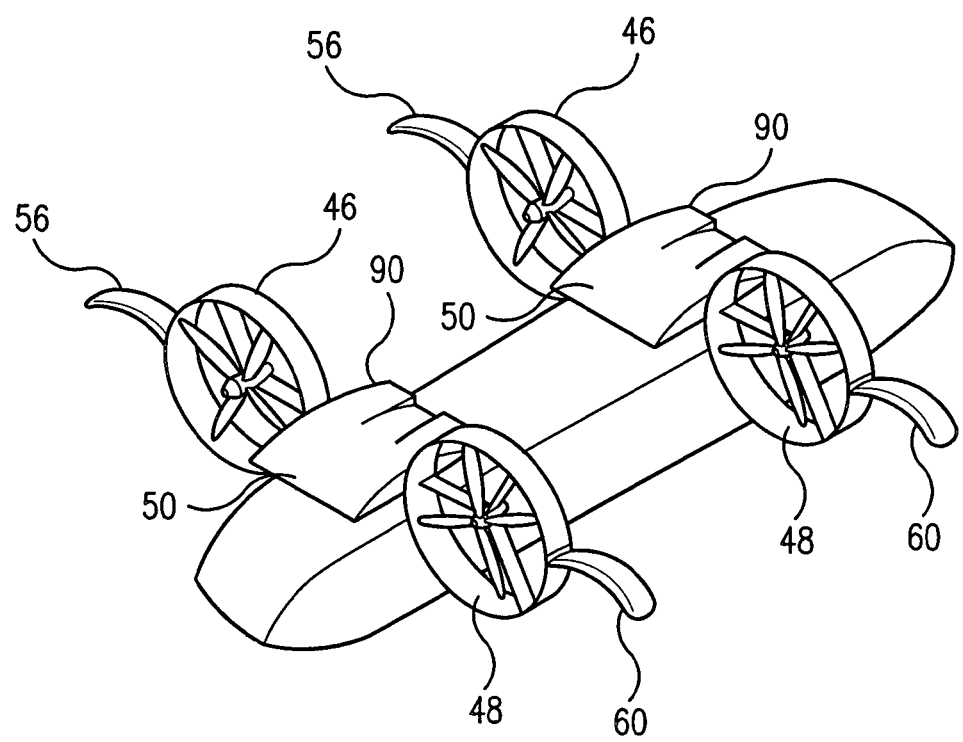
FIG. 18 is a perspective view of the two air module embodiment and ground module combination in the tilted-rotor configuration.

FIGS. 15 through 18 illustrate a two-air module 2 embodiment in which two air modules 2 are attached to a single ground module 6 and the ground module 6 provides the physical connection between the air modules 2. FIGS. 15 and 17 are plan views of a two-air modules 2 embodiment. FIG. 16 is a side view of the two-air modules 2 embodiment and FIG. 18 is a perspective view. In FIG. 15, the air modules 2 are in the second, or side-by-side configuration.

In FIGS. 16 and 17, the air modules 2 are in the tandem rotor configuration 18. In FIG. 18, the air modules 2 are in the tilted-rotor configuration 38. Air modules 2 may move between the tandem rotor configuration 18, the side-by-side rotor configuration 32 and the tilted-rotor configuration 38 for the two or more air modules 2 configuration, just as a single air module 2 aircraft may move between configurations. FIGS. 15-19 illustrate the ducted rotors 14, 16, engines 90, wing 40, wing extensions 56, 60, and flexible torsion beams 86, 88, and central units 50.

Figure 19:
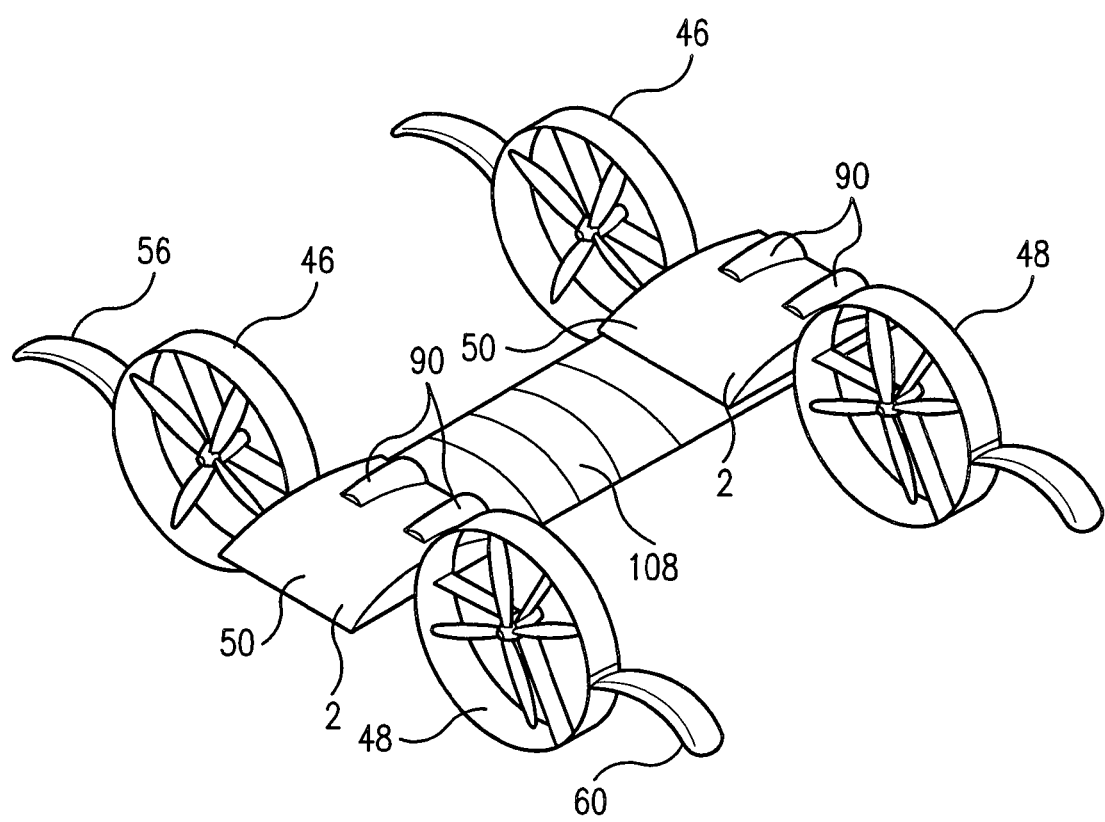
FIG. 19 is a perspective view of the two air module embodiment and scaffold combination in the tilted-rotor configuration.

As shown by FIG. 19, two or more air modules 2 may be joined by a scaffold 108, such as a spar or frame, and the load to be lifted may be rigged to the scaffold 108. When joined by a scaffold 108, the air modules 2 may fly to the load to be lifted as a single aircraft. As shown by FIG. 19, the two air modules 2 joined by the scaffold 108 flies autonomously as a single aircraft, with the two air modules 2 acting in cooperation.

The embodiments illustrated by FIGS. 18 and 19 provide that the two or more air modules 2 are in close proximity and that the first (tandem) rotor configuration 18 is not possible due to interference between the rotors 14, 16. In such an embodiment, the air modules 2 may be configured so that the air modules 2 transition only between the side-by-side rotor configuration 32 and the tilted-rotor configuration 38. The air modules 2 may be configured so that the two or more air modules 2 operate only in the side by side rotor configuration 32 when lifting of a very heavy load is desired. In such a configuration, the lifting capacity is modular. If two air module 2 will not be adequate to support the load, then a third can be added. The number of air modules 2 that can be applied to a load is limited only by the dimensions of the scaffold 108 or the ground module 6.

G. Dynamic Center of Gravity Control.

FIGS. 20 through 26 address dynamic center of gravity control. The pilot of a conventional aircraft must be aware of the center of gravity ('CG') of the aircraft to preserve the flight characteristics of the aircraft. If the CG of an aircraft moves, such as by loading or distribution of passengers, fuel or cargo within the aircraft, then changes in the aircraft attitude will occur that must be corrected by the pilot or control system. The air module 2 and ground module 6 combination may be equipped with dynamic CG control in one, two or three dimensions to allow the aircraft to automatically respond to changes in CG during flight.

Figure 20:
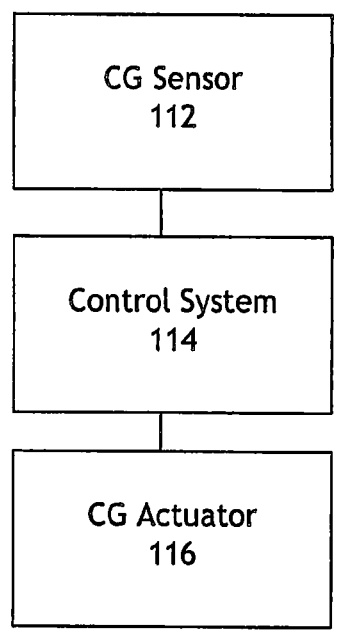
FIG. 20 is a schematic diagram of active CG control.

The control system for active dynamic CG control is illustrated by FIG. 20. The active dynamic CG control comprises one or more sensors 112 to detect a change or rate of change of attitude of the aircraft and to detect a deviation from the commanded attitude. The CG sensors 112 are configured to determine the deviation of the CG from an optimum CG location or envelope, which may be defined in one, two or three dimensions. The automatic control system generates a CG correction signal 114 to command corrections in the CG, and actuators 116 to adjust the relative locations of the CG and the center of lift of the aircraft when the aircraft is in flight.

To align the center of gravity with the center of lift, the dynamic CG control system 114 may move the center of gravity of the ground module 6 and air module 2 combination, may move the center of lift of the air module, or may move both.

FIGS. 21 through 26 illustrate different embodiments that move the center of gravity of the ground module 6 with respect to the center of lift of the air module 2 to achieve dynamic CG control.

Figure 21:
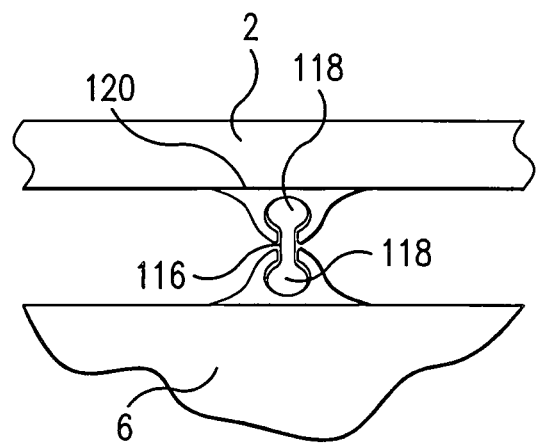
FIG. 21 is a detail view of a passive center of gravity (CG) control.

The CG control may be active or passive. FIG. 21 illustrates passive CG control. Passive CG control may be as simple as hanging the ground module 6 from the air module 2 by a link 116 that is free to move in one or two dimensions. Damping may be provided to a passive dynamic CG control system to prevent unwanted oscillations. Two ball joints 118 connect the link to the air module 2 and the ground module 6 for passive CG control in two dimensions. As the center of gravity of the ground module 6 changes, the link 116 moves within sockets 120, automatically compensating for the change in CG without intervention from the control system.

Because of the two spaced-apart rotors, the air module and the air module/ground module combination has a great deal of control power along the rotor axes of rotation 24, 26; that is, in roll when the aircraft is in the side-by-side rotor configuration 32 and in pitch when the aircraft is in the tandem rotor configuration 18. The air module 2 and ground module 6 combination has relatively low control power in the direction normal to the rotor axes of rotation 24, 26; that is, in pitch when the aircraft is in the side-by-side rotor configuration 38 and in roll when the aircraft is in the tandem rotor configuration 18. Dynamic CG control therefore is most important in the dimension normal to the rotor axes of rotation 24, 26.

Figure 22:
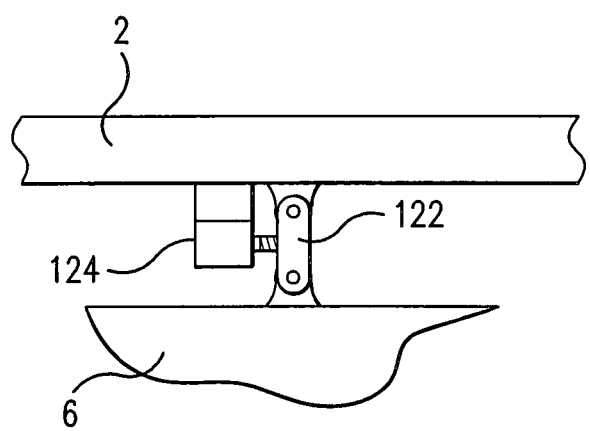
FIG. 22 is a detail view of an active CG control in one dimension.

FIG. 22 illustrates an active dynamic CG control one dimension. A pinned link 122 connects the air module 2 and the ground module 6. The pinned link 122 is capable of movement in one dimension only. A screw jack or hydraulic jack 124 receives a CG correction signal from the CG control system 114 and moves the pinned link 122 to a location determined by the CG control system 114, controlling CG in one dimension.

Figure 23:
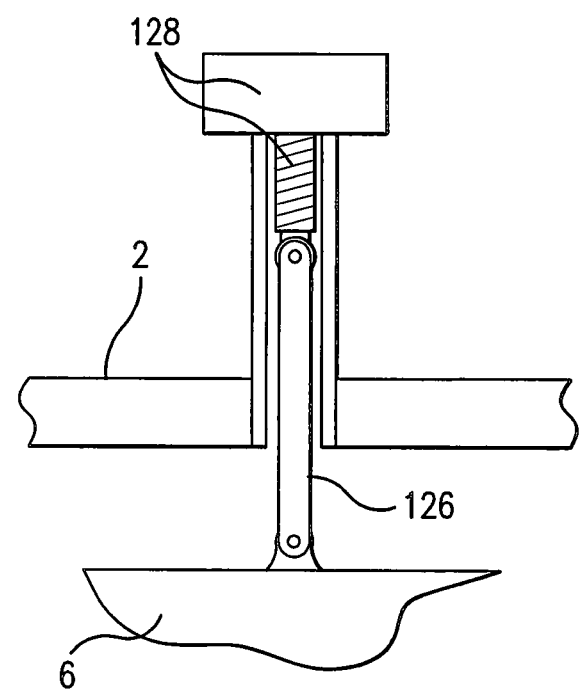
FIG. 23 is a detail view of a combination of active and passive CG control.

FIG. 23 illustrates a combination active and passive dynamic CG control in three dimensions. A flexible fabric strap 126, such as Kevlar®, is attached to the ground module 6. The other end of strap 126 is supported by actuator 128. Actuator 128 is a screw or hydraulic jack and is movable in the vertical direction; that is, in the direction parallel to the axes of rotation of rotors 14, 16 when the rotors are in the vertical position 34. Actuator 128 therefore can move strap 126 in the vertical direction. Strap 126 swings freely below air module 2 and therefore automatically adjusts CG of the aircraft in two dimensions. CG control is active in the third dimension.

Figure 24:
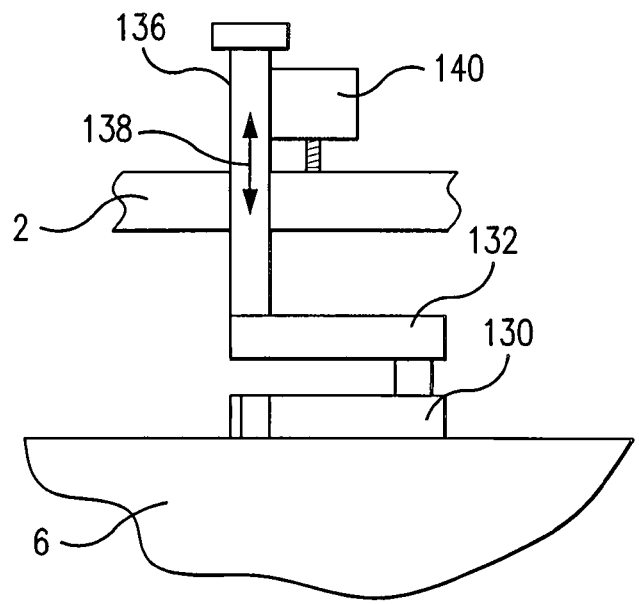
FIG. 24 is a detail view of active CG control in three dimensions.
Figure 25:
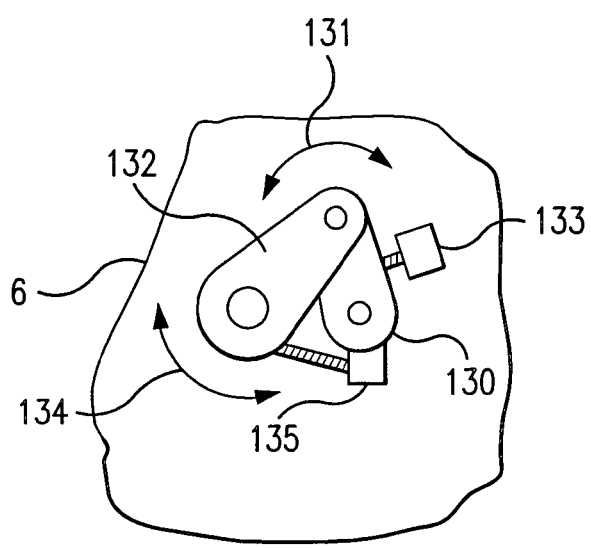
FIG. 25 is a plan view of the active CG control of FIG. 25.

FIGS. 24 and 25 illustrate an active dynamic CG control in three dimensions. FIG. 24 is a detail side view. FIG. 25 is a detail cutaway top view. First crank 130 is rotatably attached to ground module 6 and is movable in the direction indicated by arrow 131. The location of first crank 130 is adjusted by first actuator 133. A second crank 132 is rotatably attached to first crank 130 and is movable in the direction indicated by arrow 134. Second crank 132 also is rotatably attached to vertical shaft 136. The location of second crank 132 is adjusted with respect to first crank 130 by second actuator 135. CG therefore is adjustable in two dimensions by the operation of first and second actuators 130, 132. Vertical shaft 136 is adjustable in the vertical dimension, indicated by arrow 138, by the operation of third actuator 140, thereby adjusting CG in the third dimension. First, second and third actuators 130, 132, 140 may be screw jacks or hydraulic cylinders.

Figure 26:
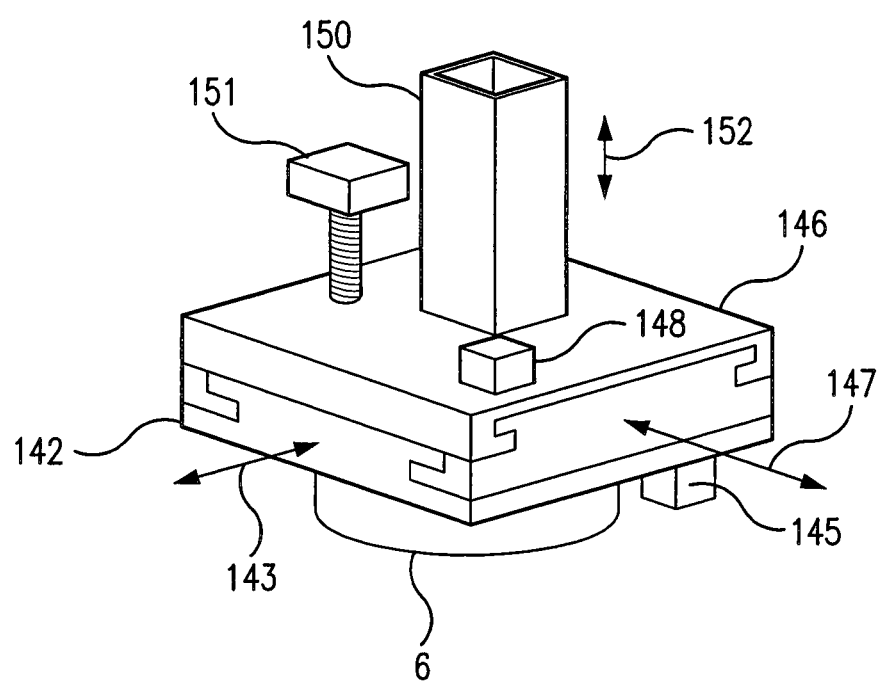
FIG. 26 is a detail view of active CG control in three dimensions.

Active dynamic CG in three dimensions also is illustrated by FIG. 26. First cross slide 142 engages ground module 6 when the air and ground modules 2, 6 are in engagement. First cross slide 142 engages second cross slide 144 so that first cross slide 142 is constrained to move in the direction indicated by arrow 143 of FIG. 27 with respect to second cross slide 144. First actuator 145 moves first cross slide 142 with respect to second cross slide 144. Second cross slide 144 also engages cross slide base 146 so that second cross slide 144 is constrained to move in the direction indicated by arrow 147 with respect to cross slide base 146. Second actuator 148 moves second cross slide 144 with respect to cross slide base 146. Cross slide base 146 is attached to column 150. Column 150 constrains the motion of cross slide base 146, and hence ground module 6, with respect to air module 2. Third actuator 151 moves cross slide base 146 in the vertical direction indicated by arrow 152 with respect to air module 2. Ground module 6 therefore is movable in three dimensions with respect to air module 2.

The active dynamic CG control can used to assist in the directional control of the aircraft, such as for lateral translation. The rotors 14, 16 do not have full cyclic pitch and have limited control power normal to the axis of rotor tilt 20 of the air module 2. The active dynamic CG control may be used to tilt the aircraft and hence to move the aircraft in the direction normal to the axis of rotor tilt 20. Dynamic CG control also may be used to assist in dynamic flight operations, such as attitude control to assist the aircraft in turning or in slowing the forward motion of the aircraft. In this mode, active CG control functions in a manner similar to weight-shift control systems employed by hang gliders, but without operator awareness or intervention as is required by hang gliders.

Changes to the center of gravity of the aircraft may be coupled with changes to the center of lift. Active CG control provides redundant control to collective pitch control, cyclic pitch control, rotor tilt and exit vane 154 control to control the attitude and flight of the aircraft.

H. Ducted Fan Embodiment Equipped with Exit Vanes

As shown by FIG. 7, the air module 2 may be equipped with one or more movable exit vanes 154 oriented parallel to the axis of rotor tilt 20. First exit vane 154 is located on the downstream side of the first ducted fan 46 in the exhaust of first ducted fan 46. The second exit vane 154 is located on the downstream side of the second ducted fan 48 and is located in the exhaust of the second ducted fan 48. First and second exit vanes 154 each may tilt about a longitudinal axis, which is oriented parallel to the axis of rotor tilt 20, to define an exit vane angle. The exhaust air from the ducted fans 46, 48 blows across the exit vanes 154, creating a reaction force on each vane 154 that is adjustable by adjusting the exit vane angle with respect to the flow of exhaust air.

The first and second exit vanes 154 provide control that is redundant to the monocyclic pitch control, providing the control system with additional control solutions to achieve a desired flight condition and providing additional control power in the direction normal to the axes of rotation 24, 26 of the first and second rotors 14, 16.

I. Ballistic Parachute and Airbag

Battle damage, human error or component failure may cause the air module 2 to cease operating within design parameters. The air module 2 or the ground module 6 may include a ballistic parachute and airbag to protect the ground module 6 and its occupants in the event of battle damage, human error or component failure.

Figure 27:
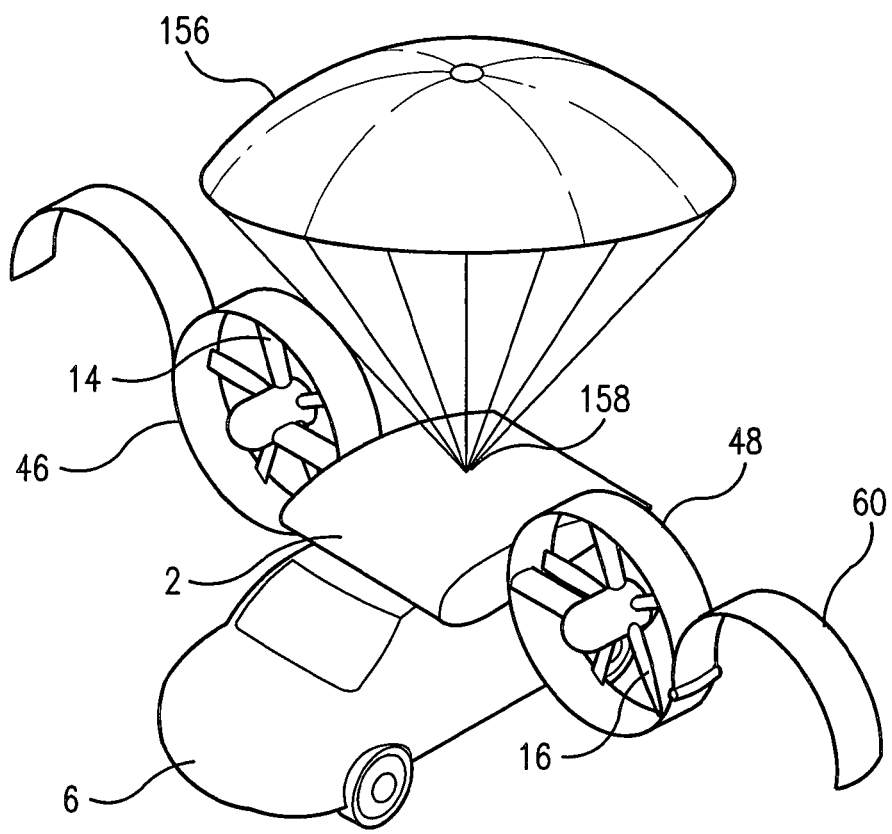
FIG. 27 is a perspective view of the aircraft with a parachute.
Figure 28:
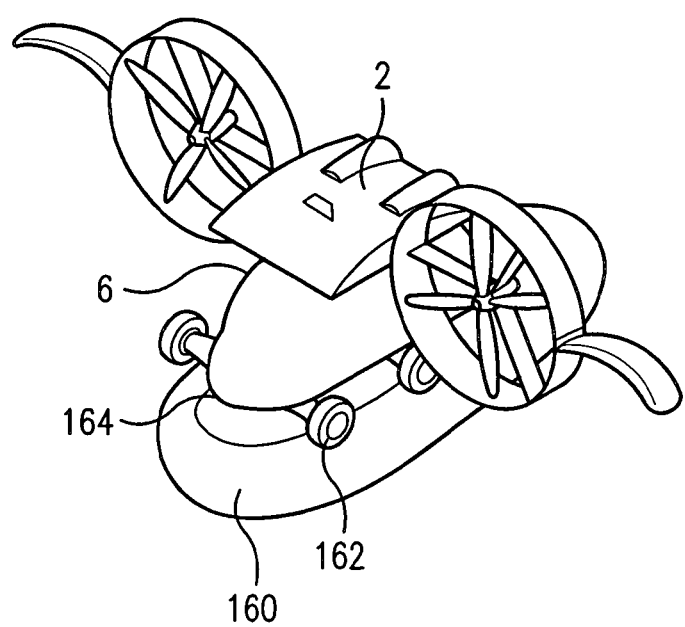
FIG. 28 is a schematic of an inflatable bag.

The conventional ballistic parachute 156 is shown by FIG. 27. The ballistic parachute 156 includes a pneumatic parachute mortar 158 mounted to the air module 2 or ground module 6. When the control system detects an aircraft condition outside of predetermine parameters, the control system automatically fires the mortar 158, deploying the ballistic parachute 156, lowering the ground module 6 and its occupants and cargo to the ground 74.

The control system may constantly monitor motion and attitude of the air module 2, and directs a mortar pointing system to aim the mortar 158 in a direction that provides optimum deployment and inflation of the parachute 156. An example is directing the mortar 158 ahead of the air module 2 to provide a vector for the parachute 156 that will accommodate aircraft forward motion and prevent the parachute 156 from opening behind the aircraft. The parachute 156 may be deployed by a steerable rocket to achieve the same end.

It is anticipated that the ballistic parachute 156 will reduce the velocity of the air module 2 and ground module 6 combination to 12 feet per second. It is further anticipated that the speed of descent is further reduced to 6 feet per second by air bag 160. The long-travel, energy-absorbing landing gear 162 of the ground module 6 can absorb the remaining impact, protecting the occupants of the ground module 6.

As shown by FIG. 26, the airbag 160 is located on the bottom side 164 of ground module 6. Operation of the airbag 160 is conventional and the airbag 160 is deployed either before or during impact between the ground module 6 and the ground 74, as detected by accelerometers.

J. Air Module Control System

Figure 29:
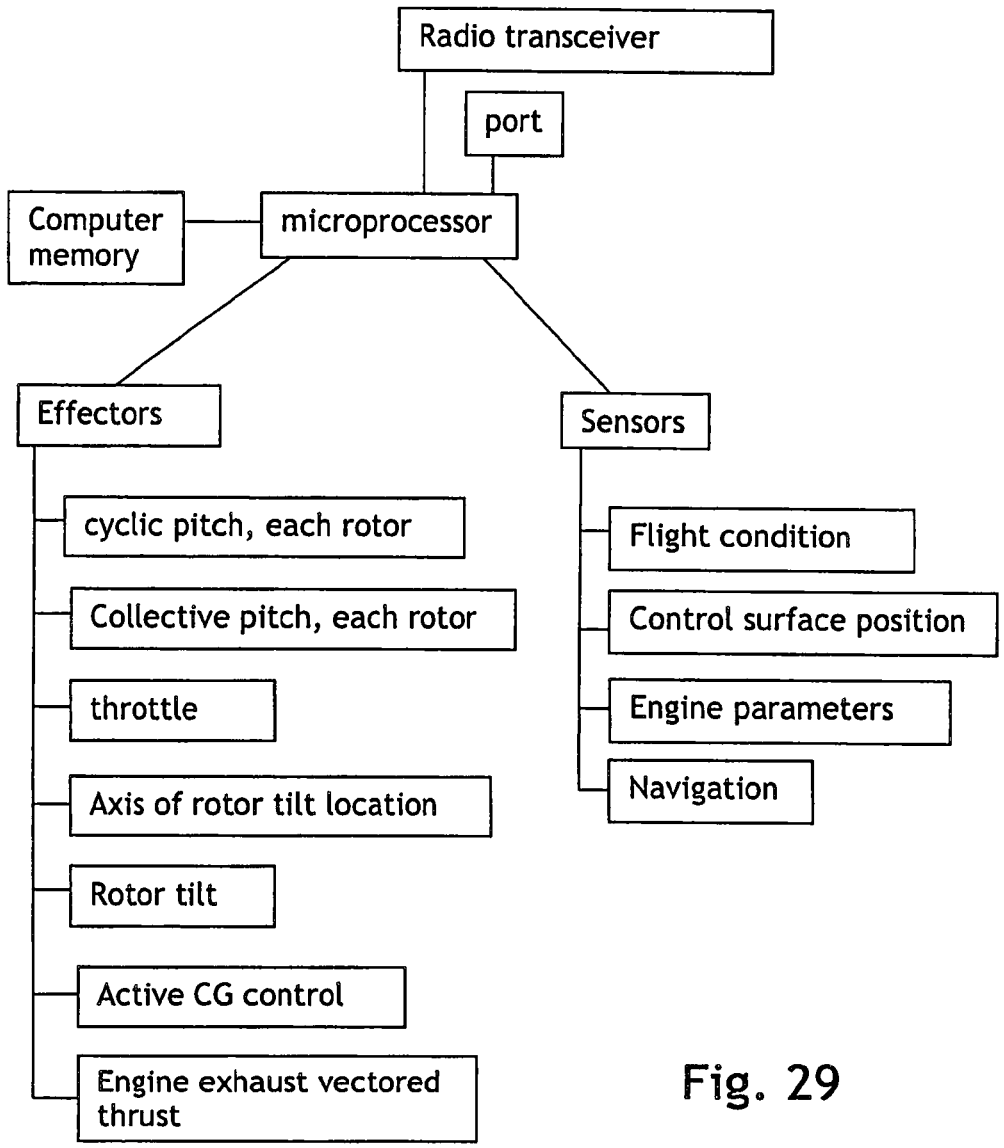
FIG. 29 is a schematic diagram of the control system.
Figure 30:
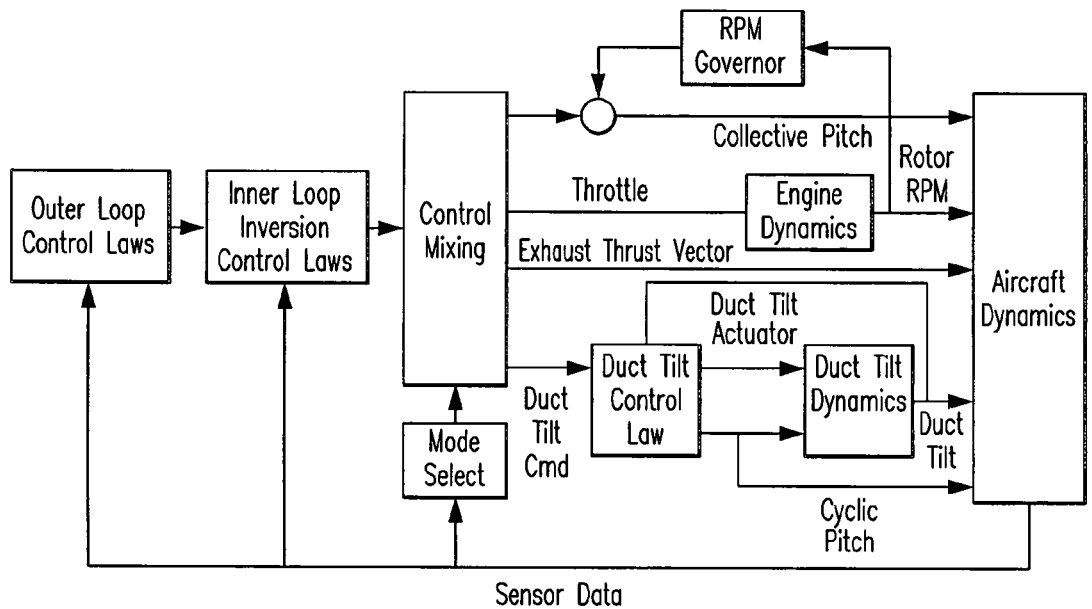
FIG. 30 is a schematic diagram of the control system.
Figure 31:
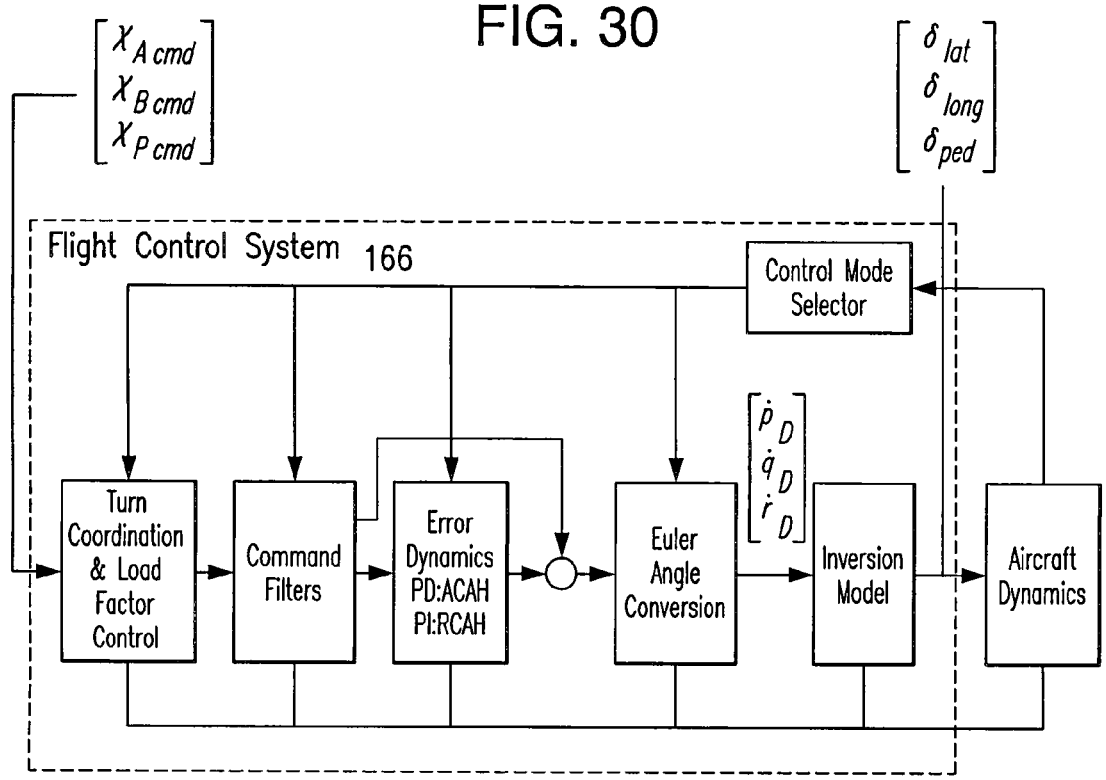
FIG. 31 is a schematic diagram of the control system.

The control system 166 of the unmanned air module 2 is illustrated by FIGS. 29 through 31. From FIG. 29, the control system 166 includes a microprocessor 168 operably connected to a computer memory 170. A power supply 172 powers the control system 166. A control interface, which may be a port 174, a radio transceiver 176, or both, allows communication with and programming of the control system 166.

The control system 166 includes a variety of sensors 178 that are operably connected to the microprocessor. The sensors 178 include flight condition sensors 180, such as attitude, airspeed, temperature, altitude, and rate sensors measuring changes to the measured flight conditions. Control surface position sensors 180 detect the position of the various flight controls, such as collective and cyclic pitch of each rotor 14, 16, rotor tilt axis 20 location, rotor tilt for each rotor, wing extension deployment, active CG control position, vectored thrust orientation, and any other control information that is determined to be useful. The engine parameter sensors 182 inform the microprocessor of matters relating to power, such as fuel reserves and consumption, engine power, temperature of key components, throttle position, vibration and additional engine power available. Navigation sensors 184 inform the microprocessor of the location of the air module 2 in space and include sensors such as global positioning system receivers and terrain and obstacle detecting sensors such as RADAR and LIDAR transmitters and receivers.

The microprocessor 168 is configured to actuate several effectors 186 to operate the flight controls of the air module 2, including cyclic and collective pitch effectors for each rotor 14, 16, engine throttle control, effectors to change the location of the axis of rotor tilt 20, effectors to tilt the rotors 14, 16, active CG control effectors, effectors to deploy and retract wing extensions 56, 60, effectors to deploy a ballistic parachute 156, and engine 90 exhaust vectoring effectors.

The microprocessor 168 is programmed to receive commands through the control interfaces 174, 176. The commands may include specification of a mission plan, a specified landing zone and waypoints between a starting location of the air module 2 and the specified landing zone. The microprocessor 168 is configured to operate as a conventional autopilot to fly the air module 2 on the route specified by the mission plan, to pass through the specified waypoints and to land at the specified landing zone, all without human intervention.

The control system 166 may receive command while in flight through the radio transceiver 176 to change the mission plan, waypoints or landing zone. The radio transceiver may receive the commands from a human operator at a remote location or from the ground module 6 when the air module 2 and ground module 6 are detached. When the air module 2 and ground module 6 are attached, the ground module 6 may communicate with the control system 166 through port 174. A human occupant of the ground module 6 may command changes to the mission plan, waypoints or landing zone.

FIGS. 30 and 31 illustrate operation of the autopilot air module control system 166. The control mixer is an open-loop system that determines the actuator commands for all control effectors 186 on the aircraft as a static function of the primary flight control inputs and the control mode is determined by airspeed and the current duct tilt. The four primary control inputs to the mixer are the lateral, longitudinal, thrust and yaw controls. The control effectors 186 include symmetric and differential duct tilt, symmetric and differential cyclic pitch, symmetric and differential collective pitch, engine throttle, and cruise flight pitch stabilization using thrust vectoring of engine exhaust. Control mixing can sometimes be achieved using a mechanical system, but for a fly-by-wire configuration the mixing can be programmed for implementation by the microprocessor 168. The latter approach provides greater flexibility and more readily accommodates modifications and upgrades. Control mixing achieves the control modes to control roll, pitch, yaw and thrust in all flight configuration 18, 32, 38 and during transition between configurations. In transition between the low speed tandem rotor configuration 18, the low speed side-by-side configuration 32, and the high speed tilted-rotor configuration 38, the controls will be blended smoothly between the modes.

The inner loop flight controls use a dynamic inversion scheme since the stability and control characteristics vary significantly in the various configurations 18, 32, 38. The inversion model can be scheduled as a function of the duct tilt, airspeed, and configuration parameters to provide consistent and predictable response characteristics across the flight envelope and configuration space.

In hover, tandem rotor configuration 18, and side-by-side rotor configuration 32, the controller will achieve attitude command/attitude hold (ACAH) response type in roll and pitch, and rate command/heading hold (RCHH) response in yaw. In tilted-rotor configuration 38 the pitch and yaw axes will include turn compensation modes, and the roll mode can either be a rate command or attitude command system. The thrust control will be open loop in the core inner loop flight controls.

The RPM governing systems on tilted-rotor aircraft are particularly challenging since the RPM must be regulated in both helicopter and cruise flight modes. Typically blade-pitch governing systems are used on tilted-rotor aircraft as they are more effective in airplane mode where the rotor torque is sensitive to changes in airspeed. The control system 166 included blade-pitch governing. The pilot's thrust or collective control is directly tied to the engine throttle. The control mixing determines collective pitch as a sum of the feed forward collective input and a trimming signal from the RPM governor. The feed forward input comes from the pilots' thrust input and the differential collective input (tied to roll and yaw axes). The RPM governor trim signal is based on proportional plus integral compensation on the rotor speed error from the nominal.

When the air module 2 is piloted, either by a human occupant of the ground module 6 or by a human operator at a remote location, the outer loop control laws will achieve a translation rate command response type in rotary wing flight, where the vehicle lateral and longitudinal speed are proportional to pilot stick input. In the thrust axis, the control will achieve vertical speed command/height hold. Such a control law can allow operation in degraded visual environments or high confined environments with reasonably low pilot workload. Upon the pilot releasing the controls, the system will revert to full autonomous control. In piloted tilted-rotor configuration 38, the outer loop controls will feature airspeed and altitude hold modes that can also be programmed through the displays. The outer loop control laws can be tied to a basic way point navigation system.

Unlike a conventional tilted-rotor aircraft, symmetric and differential duct tilt of the air module 2 will be part of the inner loop primary flight control for the pitch, roll and yaw axes. The use of cyclic pitch on the rotors will be used to twist the ducts differentially through a flexible torsion beam 86, 88 and will reduce the actuation requirements for duct tilt during conversion to tilted-rotor configuration 38. A stiff rotor system 14, 16 will be used, so significant hub 96 moments can be achieved by cyclic pitch. If engines 90 are selected having high exhaust gas flow rates, the exhaust gas can be vectors to provide additional control in pitch when the air module 2 is in the tilted-rotor configuration 38.

K. Alternate Rotor Configurations

Figure 32:
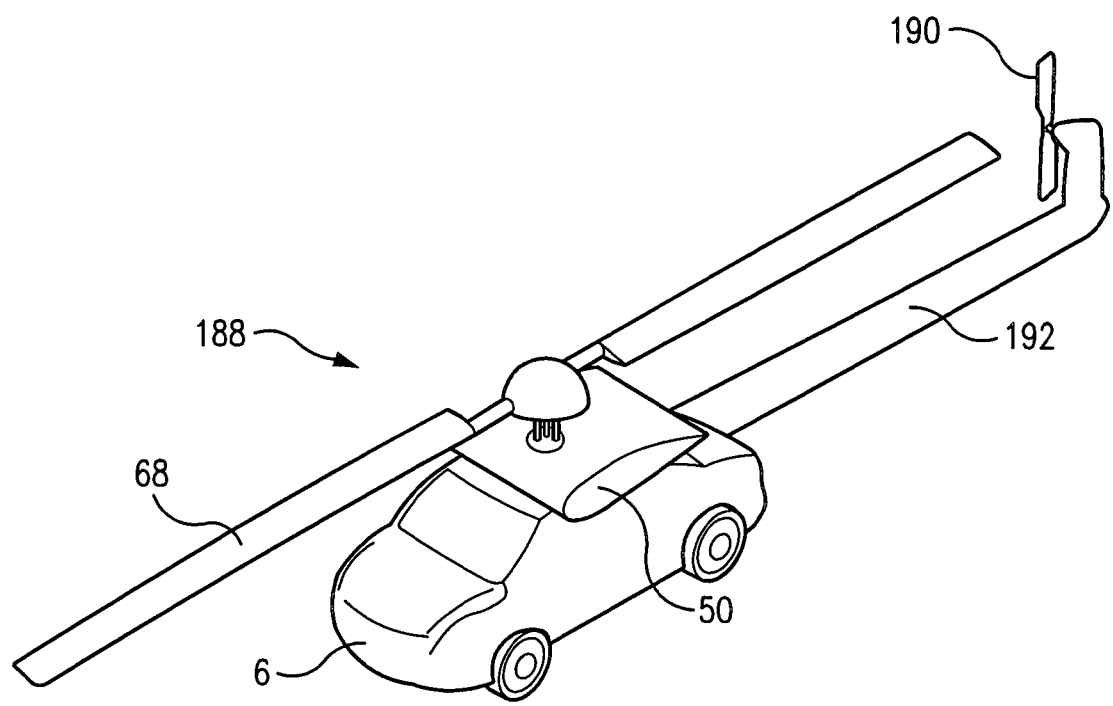
FIG. 32 is a perspective view of a single open rotor embodiment.
Figure 33:
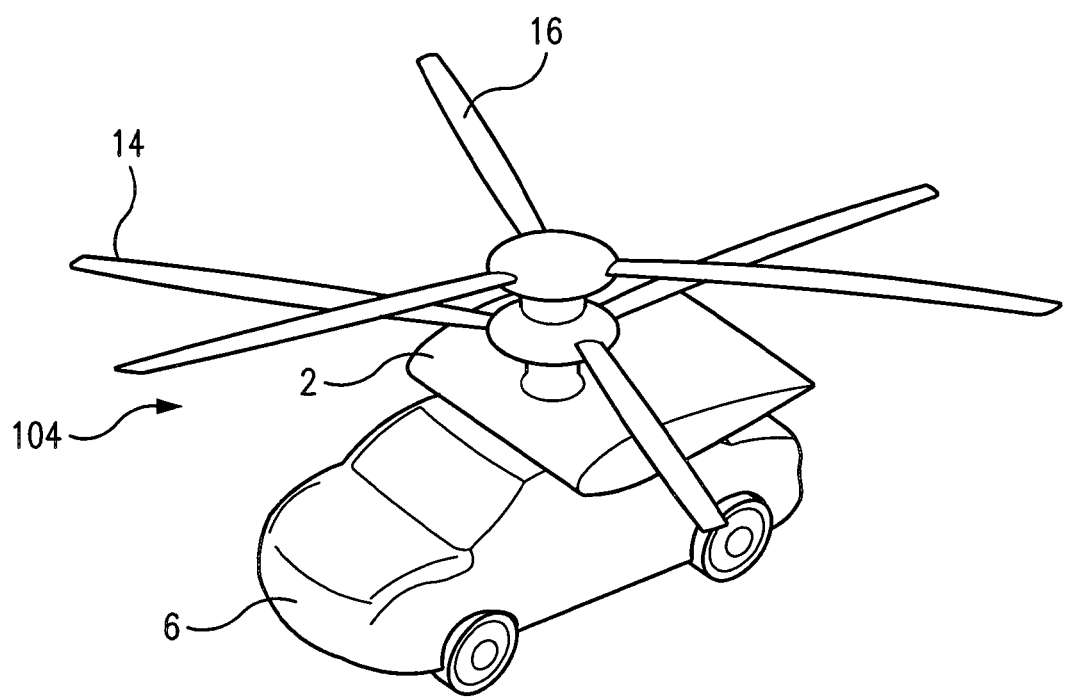
FIG. 33 is a perspective view of a coaxial open rotor embodiment.
Figure 34:
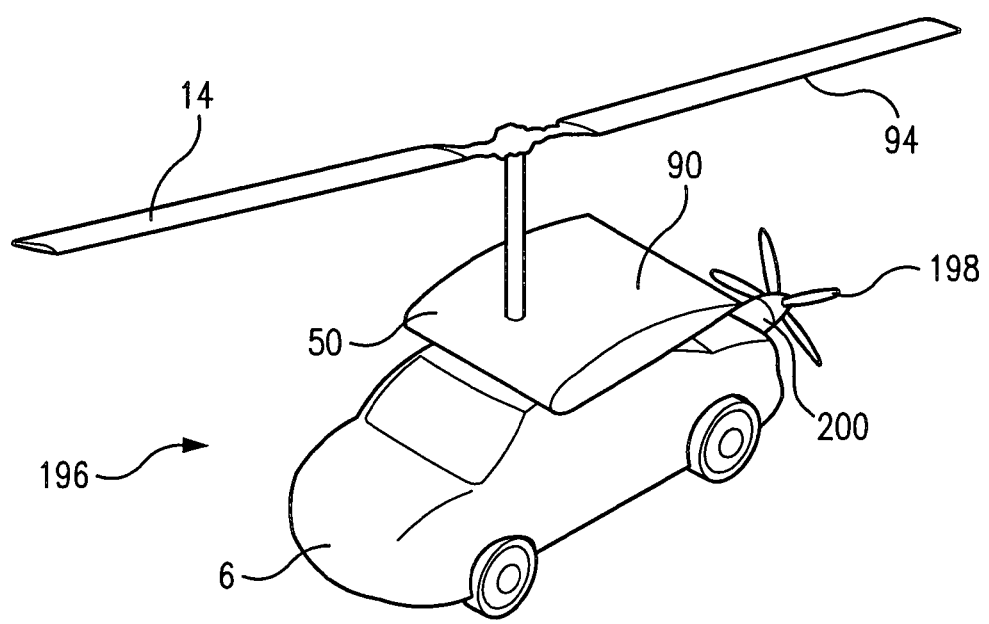
FIG. 34 is a perspective view of an autogyro air module and ground module combination.

FIGS. 32 through 34 illustrate alternate configurations that rotary wing 4 may take. FIG. 32 illustrates a single ducted fan or single open rotor 188 embodiment of the air module 2. A single rotor 14 is powered by the central unit 50. A propeller 190 mounted on a boom 192 reacts the torque of the single rotor 188 to control yaw. The single rotor 188 embodiment is modular and the air module 2 and ground modules 6 may be operated independently; however, the air module 2 and the air module 2 and ground module 6 combination may fly in only one configuration as a rotary wing aircraft.

FIG. 33 illustrates a coaxial open rotor 194 embodiment of the air module 2. Two counter-rotating coaxial rotors 14, 16 are powered by the central unit 50. Because of the counter-rotating rotors 14, 16, the torque reaction of each rotor cancels that of the other and no boom 192 or propeller 190 is required. The coaxial open rotor 194 embodiment otherwise is similar to the single open rotor 188 embodiment of FIG. 32 and may fly in only one configuration as a rotary wing aircraft.

In each of FIGS. 32 through 34, the air module 2 and ground module 6 are modular and may be detached and each may operate independently of the other. The air module 2 may take off, fly and land independently from the ground module 6. Where the ground module 6 is a vehicle ground module 70, the vehicle ground module 70 may operate on the ground 74 under its own power independent of the air module 2. The air module 2 and ground module 6 may be joined selectably so that the air module 2 supports the ground module 6 in flight and the ground module 6 supports the air module 2 when on the ground.

Figure 35:
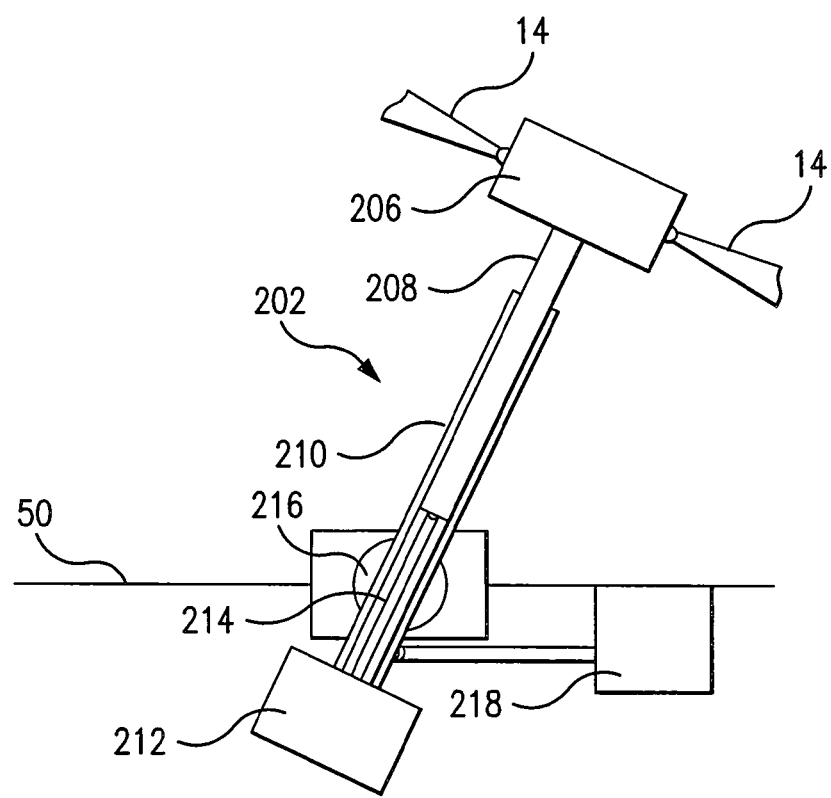
FIG. 35 is a partial cutaway view of a tilting, extendable mast for an autogryo air module.

FIG. 34 illustrates an autogyro air module 196 embodiment. The engine 90 in central unit 50 powers a vectored thruster 198, such as a propeller or ducted fan. The vectored thruster 198 is shown by FIG. 35 as a pusher propeller on boom 200, but the vectored thruster 198 may be a tractor propeller and may be mounted to ground module 6. The vectored thruster 198 provides forward thrust to the air module 2 and ground module 6 combination. Air moving from the underside of the spinning rotor disc to the top side of the rotor disc causes the rotor 14 to keep rotating, generating lift and maintaining the air module 2 and ground module 6 combination airborne.

Any of the embodiments may be equipped with a propeller or other vectored thruster 198 to provide forward thrust in addition to thrust from the open rotor 188 or the ducted fan 46, 48.

The autogyro air module 196 may be a 'jump' autogyro. For takeoff, the rotor 14 is connected to the engine 90 and rotor 14 is turned by the engine, storing kinetic energy in the rotor 14. The rotor 14 is disconnected from the engine 90, the collective pitch of the rotor blades 94 is increased, causing the rotor 14 to generate lift, and the engine 90 is connected to the vectored thruster 198. The air module 2 rises vertically and is driven forward by the vectored thruster 198. When the aircraft reaches an adequate forward speed, the air moving through the rotor 14 is adequate to maintain the rotation of the rotor blade 94 and to maintain flight. The autogyro air module 196 and ground module 6 are modular and operate in the same fashion as the ducted fan air 46, 48 module and the open rotor air module 188.

Air module 2 may be in any other configuration known in the rotary wing 4 aircraft art, including a twin rotor aircraft having intermeshing rotors and a tandem rotor aircraft that is not capable of transitioning to the side-by-side rotor configuration 32 or the tilted-rotor configuration 38. The air module 2 may have two rotors in the side-by-side rotor configuration 32 that are not capable of moving to the tandem rotor configuration 18 or the tilted-rotor configuration 38. The air module 2 may be an aircraft that is capable of flying in the side-by-side rotor configuration 32 and the tilted-rotor configuration 38, but that is not capable of flying in the tandem rotor configuration 32.

FIG. 35 illustrates a rotor mast 202 of the autogyro air module 196. The rotor mast 202 incorporates both an extendable mast 204 for ground obstacle avoidance and a tiltable rotor mast for active center of gravity (CG) control. Rotor 14 is attached to autogyro rotor hub 206. Rotor 14 spins about center of rotation 24 of autogyro rotor hub 206. Mast 202 transmits lifting forces from the rotor hub 206 to the central unit 50 of air module 2. Mast 202 comprises a first mast portion 208 and a second mast portion 210. First and second mast portions 208, 210 are in a telescoping relationship and may be keyed or splined to avoid rotation of the first and second mast portions 208, 210 with respect to each other. Alternatively, the first mast portion 208 may turn with the rotor 14 with respect to second mast portion 210 and may define the rotor bearing allowing the rotor 14 to turn. Rotor extension screw jack 212 operates on rotor extension screw 214, which is attached to first mast portion 208. The position of the rotor extension screw determines the extended length of rotor mast 202.

Alternatively, rotor extension screw jack 212 and rotor extension screw 214 may be dispensed with and the extension of the autogyro rotor mast determined by the lift generated by the rotor 14. When the rotor 14 is spun by the engine 90 for takeoff, the lift generated by the spinning rotor 14 extends the rotor mast 202. When the aircraft lands and the rotor 14 slows, the rotor 14 loses lift and the mast 202 moves from the extended to the retracted position.

FIG. 35 also shows active CG control for the autogyro air module 2 through tilting of rotor mast 202. Rotor mast 202 is attached to central unit 50 through hinge 216. The nature of hinge 216 depends on the axes of active CG control. For one axis of CG control, hinge 216 can be an axle and bearings supporting the axle. For two axis CG control, hinge 216 can be a ball joint. For two axis CG control, a second rotor tilt screw jack 218 is utilized for control in the second axis. Rotor tilt screw jack 218 tilts rotor mast 202 about hinge 216, and hence determines the location and orientation of rotor lift with respect to the CG of the aircraft. The rotor tilt screw jack 218 is the CG actuator attached to the CG control system of FIG. 20.

Figure 36:
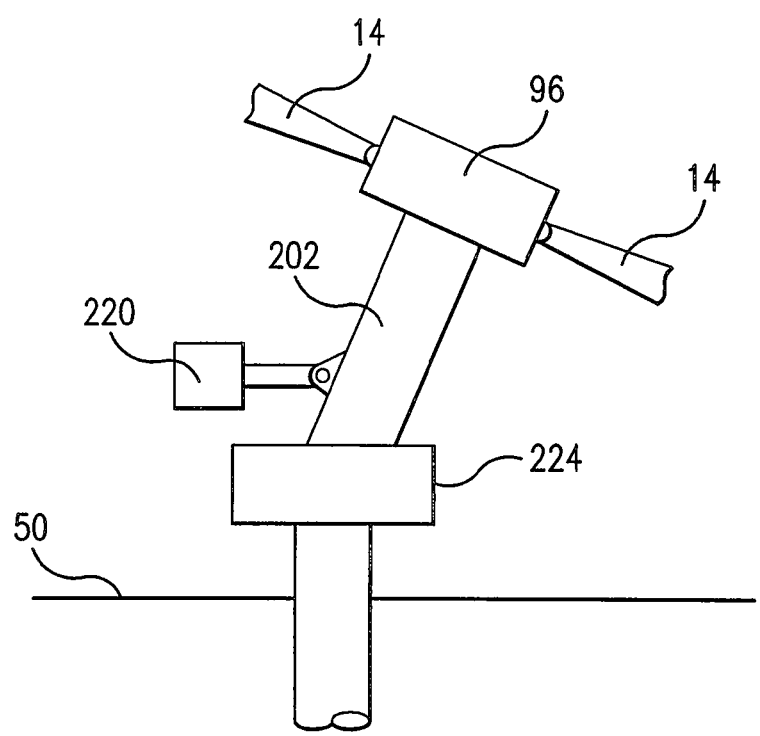
FIG. 36 is a detail of a tilting mast for an open rotor air module.

FIG. 36 illustrates a rotor tilt active CG system for a open rotor air module 2 that flies as a helicopter and as illustrated by FIGS. 9 through 11, 32 and 33. Screw jack 220 determines the tilt of rotor mast 202. The rotor drive shaft 222, contained within rotor mast 202, transfers power to rotor 14 through a flexible coupling 224. The screw jack 220 is the CG actuator shown by FIG. 21 to move the center of lift of the air module 2 with respect to the center of gravity.

Figure 37:
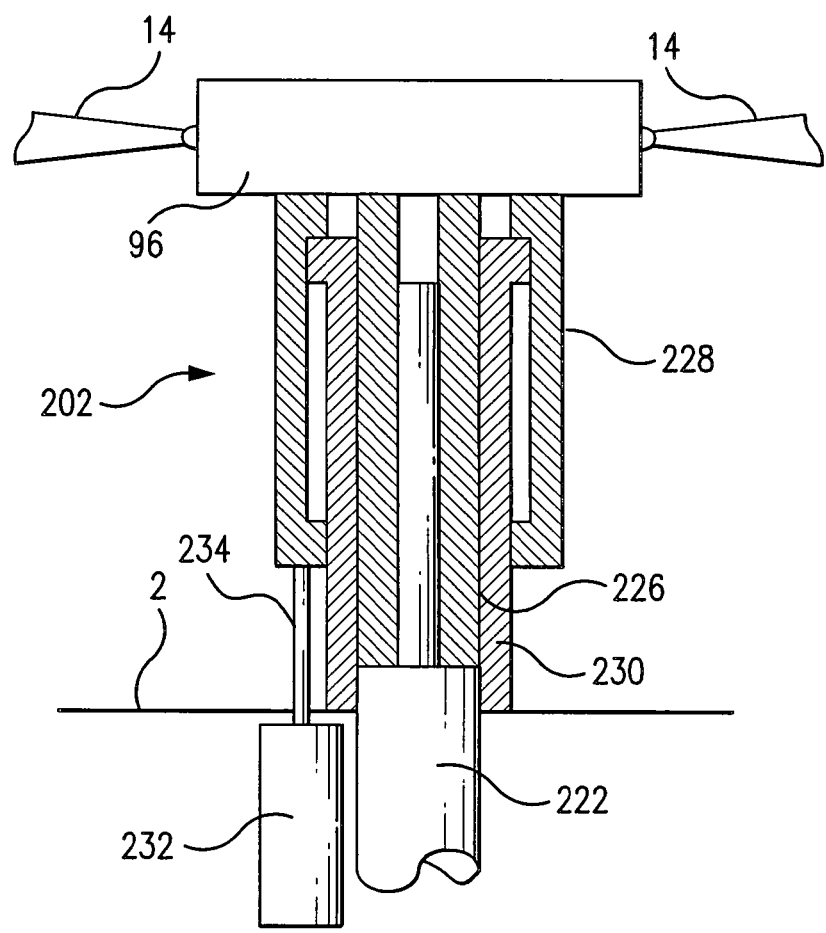
FIG. 37 is a detail cross section of an extendable mast for a open rotor air module, with the mast in the retracted position.
Figure 38:
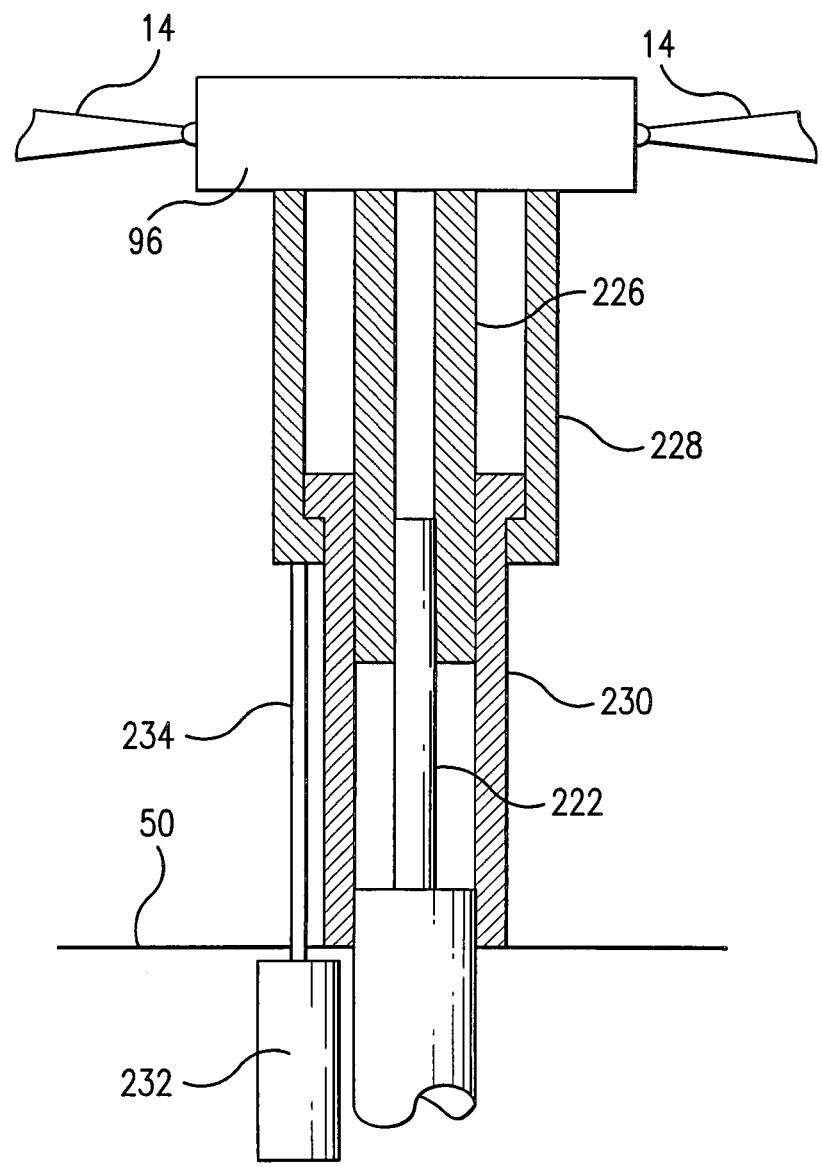
FIG. 38 is a detail cross section of an extendable mast for an open rotor air module with the mast in the extended position.

FIGS. 37 and 38 illustrate an extendable rotor mast 202 for an open rotor 188 air module 2 that flies as a helicopter and as illustrated by FIGS. 9 through 11, 32 and 33. The extendable rotor mast 202 allows the rotor 14 to have a lower profile for ground transportation of the air module 2, but allows the rotor 14 to have a higher configuration for safe ground operations when the rotor 14 is turning.

FIG. 37 illustrates the extendable rotor mast 202 in the contracted (lower) position. Drive shaft 222 is turned by engine. Drive shaft 222 is splined to rotor shaft 226, so that rotor shaft 226 may slidably move in a longitudinal direction with respect to drive shaft 222 and so that drive shaft 222 transmits rotational power to rotor shaft 226. Rotor shaft 226 turns rotor 14. Rotor mast 202 includes a first rotor mast portion 228 and a second rotor mast portion 230. First rotor mast portion 228 is attached to hub 96 and second rotor mast portion 230 is attached to central unit 50. First and second rotor mast portions 228, 230 are splined or keyed one to the other and do not rotate with rotor 14. First and second rotor mast portions 228, 230 maintain the stationary portion of swashplate 98 within hub 96 in a stable position. First and second rotor mast portions 228, 230 are movable with respect to each other by rotor extension screw jack 232 and screw 234.

FIG. 38 shows the extended position of the extendable rotor mast 202 of FIG. 38. Splined driveshaft 222 and rotor shaft 226 transmit power to turn rotor 14 while first and second mast portions 228, 230 do not rotate and maintain swashplate in hub 96 in a stable, stationary condition.

Rotor extension screw jack 232 and screw 234 may be dispensed with and lift generated by the rotor 14 may be used to extend extendable rotor mast 202. Loss of lift from the slowing rotor 14 after landing may automatically retract extended rotor mast 202.

In this document, the term "screw jack" refers to screw jacks and to any other conventional apparatus to transmit linear motion, including a hydraulic cylinder and a rack and pinion.

Figure 39:
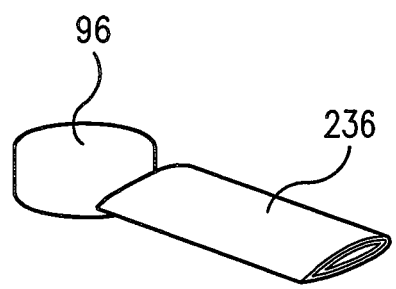
FIG. 39 is a perspective view of an extendable rotor in the retracted position.
Figure 40:
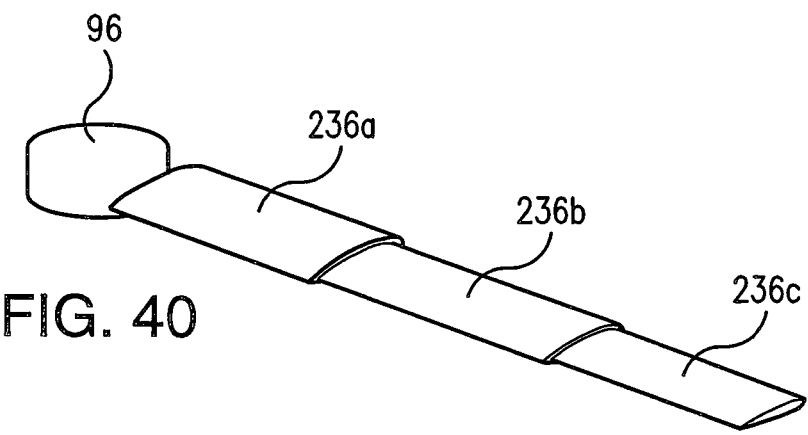
FIG. 40 is a perspective view of an extendable rotor in the extended position.
Figures 41, 42:
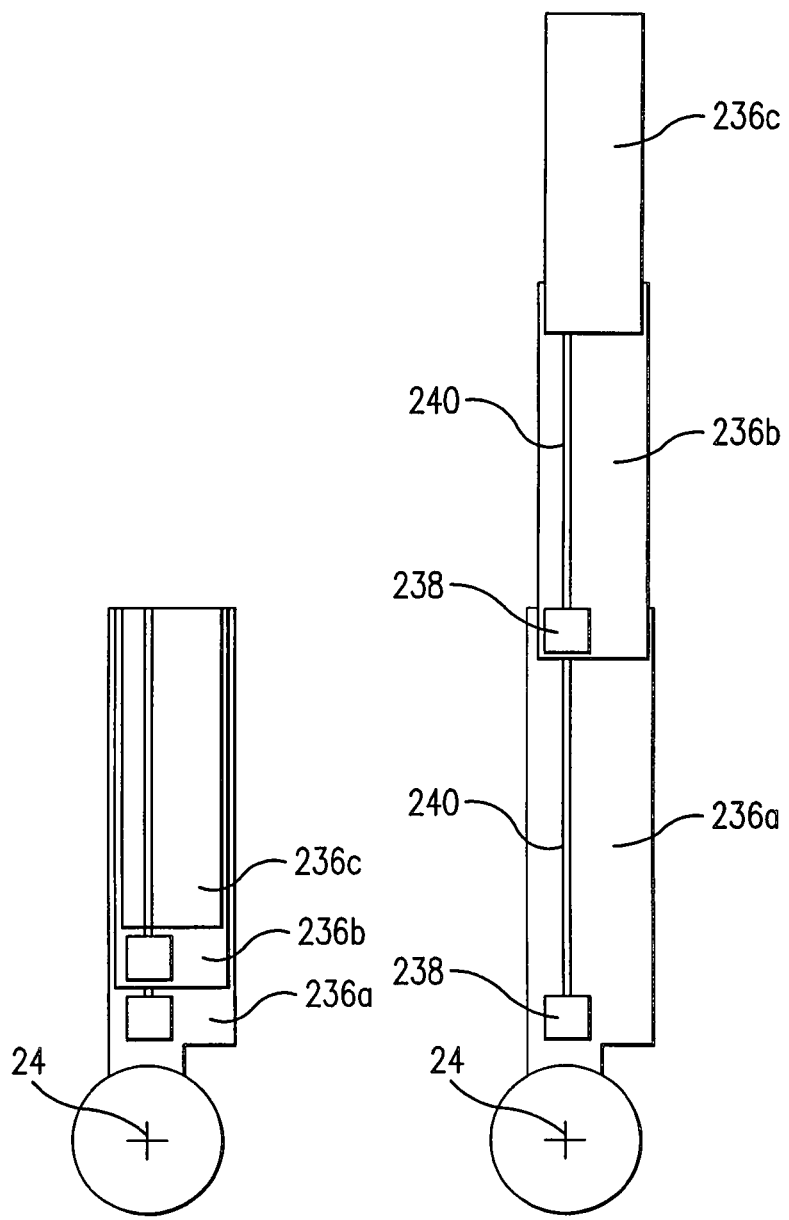
FIG. 41 is a cutaway view of the extendable rotor in the retracted position.
FIG. 42 is a cutaway view of the extendable rotor in the extended position.

The open rotor air modules of FIGS. 9 through 11, 32 and 33 may be configured to have a rotor 14 with extendable blades 236, illustrated by FIGS. 39 through 42. FIG. 39 shows the extendable blade 236 in the retracted position for ease of ground travel. FIG. 40 shows the extendable blade 236 in the extended position. The extendable blades 236 are telescoping, as illustrated by FIGS. 40, 41 and 42.

FIGS. 41 and 42 are a cutaway plan views showing the telescoped blades 236 in the retracted and the extended positions. The telescoping blades 236 are illustrated have three sections, 236a, b and c, though extendable blades 236 with two sections or with more than three sections are contemplated by the invention. Blade extension screw jacks 238 and blade extension screws 240 move the blades 236 between the extended and retracted positions.

What is claimed is:

1. An air vehicle, the air vehicle comprising:
   a. an air module;
   b. at least one rotary wing operably attached to said air module;
   c. said air module is configured to be selectably attached to a ground module, said at least one rotary wing being configured to support said ground module and said air module in a flight when said ground module and said air module are attached, said rotary wing being configured to support said air module in said flight when said ground module and said air module are not attached;
   d. a center of gravity effector, said center of gravity effector being configured to locate a center of gravity of said ground module with respect to a center of lift of said air module when said air module is attached to said ground module;
   e. a sensor, said sensor being configured to detect a change in an attitude of said air module or said ground module, a microprocessor operably connected to said sensor, said microprocessor being configured to send a center of gravity correction signal in response to a change in attitude detected by said sensor;
   f. said center of gravity effector being a dynamic center of gravity effector that is movable in one dimension, said dynamic center of gravity effector being configured to receive said center of gravity correction signal from said microprocessor, said air module having a center of lift when said air module is in flight, said ground module and said air module having a center of gravity when said ground module and said air module are in flight, said dynamic center of gravity effector being configured to change a relative location of said ground module with respect to said air module in said one dimension, whereby said dynamic center of gravity effecter changes a relative location of said center of gravity and said center of lift.

2. The air vehicle of claim 1, further comprising:
   a center of lift effector, said center of lift effector being configured to receive said center of gravity correction signal from said microprocessor, said center of lift effector being configured to change said center of lift of said air module, whereby said center of lift effecter changes a relative location of said center of gravity and said center of lift.

3. The air vehicle of claim 1 wherein said at least one rotary wing is tiltable about an axis of rotor tilt to a tilted position and wherein said one dimension is normal to said axis of rotor tilt, said dynamic center of gravity effector being configured to change a relative location of said ground module with respect to said air module in said one dimension generally normal to said axis of rotor tilt when said air and ground modules are attached.

4. The air vehicle of claim 3 wherein said center of gravity effector is configured for passive relative movement of said air module and said ground module in a second dimension when said air module and said ground module are attached, said second dimension being generally parallel to said axis of rotor tilt, whereby when said ground module is attached to said air module said center of gravity effector is configured to allow relative movement of said air and ground modules passively in said second dimension without intervention by said microprocessor and without reference to said center of gravity correction signal.

5. The air vehicle of claim 4 wherein said passive relative movement in said second dimension is damped to prevent oscillation between the ground and air modules when the ground and air modules are attached.

6. The air vehicle of claim 1 wherein said center of gravity correction signal is configured to command said center of gravity effector to move said ground module vertically with respect to said air module, said center of gravity effector being configured to actively change a relative location of said ground module with respect to said air module in said vertical dimension when said ground and air modules are attached.

7. The air vehicle of claim 3 wherein said dynamic center of gravity effector is configured to change a relative location of said ground module with respect to said air module in a second dimension when said ground and air modules are attached, said second dimension being generally parallel to said axis of rotor tilt, whereby said dynamic center of gravity effecter may change a relative location of said center of gravity and said center of lift in said second dimension.

8. The air vehicle of claim 7 wherein said center of gravity correction signal is configured to command said center of gravity effector to move said ground module in a vertical dimension with respect to said air module, said center of gravity effector being configured to actively change a relative location of said ground module with respect to said air module in said vertical dimension when said ground and air modules are attached.

9. The air vehicle of claim 1 wherein said dynamic center of gravity effector comprises a cross slide, said cross slide allowing relative motion in said one dimension between said air module and said ground module under a control of said center of gravity correction signal when said air module and said ground module are attached.

10. The air vehicle of claim 1 wherein said dynamic center of gravity effector comprises a crank, said crank allowing relative motion in said one dimension between said air module and said ground module under a control of said center of gravity correction signal when said air and ground modules are attached.

11. The air vehicle of claim 1 wherein said dynamic center of gravity effector comprises a pinned link, said pinned link allowing relative motion between said air module and said ground module under a control of said center of gravity correction signal when said air and ground modules are attached.

12. An air vehicle, the air vehicle comprising:
    a. an air module;
    b. at least one rotary wing operably attached to said air module;
    c. said air module is configured to be selectably attached to a ground module, said at least one rotary wing being configured to support said ground module and said air module in a flight when said ground module and said air module are attached, said rotary wing being configured to support said air module in said flight when said ground module and said air module are not attached;

d. a center of gravity effector, said center of gravity effector being configured to locate a center of gravity of said ground module with respect to a center of lift of said air module when said air module is attached to said ground module wherein said center of gravity effector is configured for passive relative movement of said air module and said ground module when said air module and said ground module are attached, whereby said center of gravity effector is configured to allow relative movement of said air and ground modules automatically in response to a change in said center of gravity without intervention by a control system.

13. The personal-air vehicle of claim 12, further comprising:
  a. a sensor, said sensor being configured to detect a change in an attitude of said air module or said ground module, a microprocessor operably connected to said sensor, said microprocessor being configured to send a center of gravity correction signal in response to a change in attitude detected by said sensor;
  b. a center of lift effector, said center of lift effector being configured to receive said center of gravity correction signal from said microprocessor, said air module having a center of lift when said air module is in flight, said ground module and said air module having a center of gravity when said ground module and said air module are in flight, said center of lift effector being configured to change a center of lift of said air module, whereby said center of lift effecter changes a relative location of said center of gravity and said center of lift.

14. The air vehicle of claim 12 wherein said center of gravity effector comprises a link that is free to move in two dimensions, said link having two ball joints that connect said link to said air and ground modules when said air and ground modules are attached.

15. The air vehicle of claim 12 wherein said center of gravity effector comprises a strap, said strap allowing movement of said ground module with respect to said air module in two dimension when said air and ground modules are attached.

16. The air vehicle of claim 13 wherein said at least one rotary wing is tiltable about an axis of rotor tilt to a tilted position and wherein said center of gravity effector is configured for passive relative movement of said air module and said ground module when said air module and said ground module are attached in at least one dimension, said one dimension being normal to said axis of rotor tilt.

17. The air vehicle of claim 13 wherein said center of gravity correction signal is configured to command said center of gravity effector to move said ground module vertically with respect to said air module, said center of gravity effector being configured to actively change a relative location of said ground module with respect to said air module in said vertical dimension when said ground and air modules are attached.

18. The air vehicle of claim 13 wherein said center of lift effector is configured to move said rotary wing with respect to said air module and to thereby change the relative locations of the said center of lift and said center of gravity.

* * * * *